United States Patent
Tidwell et al.

(10) Patent No.: US 7,577,088 B2
(45) Date of Patent: Aug. 18, 2009

(54) SYSTEM AND METHOD TO BACKUP COMMUNICATION OCCURRING ACROSS A PLURALITY OF SUBSCRIBER LINES

(75) Inventors: Brad D. Tidwell, Harvest, AL (US); Jamie S. Kelly, Madison, AL (US); John B. Bartell, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 832 days.

(21) Appl. No.: 10/758,903

(22) Filed: Jan. 16, 2004

(65) Prior Publication Data

US 2004/0146004 A1     Jul. 29, 2004

Related U.S. Application Data

(60) Provisional application No. 60/440,847, filed on Jan. 17, 2003.

(51) Int. Cl.
     *G01R 31/08*    (2006.01)
(52) U.S. Cl. ......................... 370/217; 379/25
(58) Field of Classification Search ................. 370/217, 370/535; 375/375; 379/25
     See application file for complete search history.

(56) References Cited

U.S. PATENT DOCUMENTS

| | | | |
|---|---|---|---|
| 4,935,642 A * | 6/1990 | Obelode et al. ............... 307/32 |
| 5,193,086 A | 3/1993 | Satomi et al. | |
| 5,226,037 A | 7/1993 | Satomi et al. | |
| 5,406,564 A | 4/1995 | Okita | |
| 5,515,429 A | 5/1996 | Kawada et al. | |
| 5,581,542 A | 12/1996 | Kato et al. | |
| 5,694,398 A * | 12/1997 | Doll et al. ..................... 370/524 |
| 5,864,592 A * | 1/1999 | Itri ............................. 375/375 |
| 6,282,265 B1 * | 8/2001 | Lowell et al. ................. 379/25 |
| 6,564,051 B2 | 5/2003 | Struhsaker et al. | |
| 6,775,305 B1 * | 8/2004 | Delvaux ....................... 370/535 |
| 6,996,134 B1 * | 2/2006 | Renucci et al. .............. 370/535 |
| 7,058,007 B1 * | 6/2006 | Daruwalla et al. ........... 370/216 |

* cited by examiner

*Primary Examiner*—Hassan Kizou
*Assistant Examiner*—Jeffrey M Rutkowski
(74) *Attorney, Agent, or Firm*—Lanier Ford Shaver & Payne P.C.

(57) ABSTRACT

A communication system comprises a plurality of transceivers and logic. A first transceiver is configured to communicate via a first subscriber line with a transceiver located at a remote premises. A second transceiver is configured to communicate via a second subscriber line with a transceiver located at the remote premises, and a third transceiver is configured to communicate via a third subscriber line with a transceiver located at the remote premises. The logic is configured to switch communication from the first transceiver to the third transceiver in response to a detection of a communication problem associated with the first subscriber line. The logic is further configured to switch communication from the second transceiver to the third transceiver in response to a detection of a communication problem associated with the second subscriber line.

31 Claims, 11 Drawing Sheets

SYSTEM AND METHOD TO BACKUP COMMUNICATION OCCURRING ACROSS A PLURALITY OF SUBSCRIBER LINES

CROSS REFERENCE TO RELATED APPLICATION

This application claims priority to U.S. Provisional Application No. 60/440,847, entitled "System and Method for Using a Backup Subscriber loop to Backup Communication Occurring across a Plurality of Subscriber loops," and filed on Jan. 17, 2003, which is incorporated herein by reference.

RELATED ART

In telecommunication networks, communication occurring across a subscriber line, also referred to as a "subscriber loop," is sometimes protected by using a backup subscriber line. In this regard, a pair of primary transceivers is typically used to terminate and communicate over a first subscriber line, referred to herein as a "primary subscriber line." Further, a pair of backup transceivers is used to terminate and communicate over a second subscriber line, referred to herein as a "backup subscriber line." The backup transceivers are typically configured identical to the primary transceivers such that the same type of communication may occur over either the primary transceivers or the backup transceivers, as will be described in more detail below.

Initially, the primary transceivers communicate over the primary subscriber line while the backup subscriber line and the backup transceivers are idle. If the communication occurring over the primary subscriber line becomes significantly degraded, then the communication is switched to the backup subscriber line such that the communication occurs over the backup subscriber line instead of the primary subscriber line. By switching to the backup subscriber line, a relatively high throughput and signal quality can be maintained despite the occurrence of a communication problem that degrades the performance of the primary subscriber line.

Thus, by maintaining backup transceivers and backup subscriber lines, a telecommunication service provider is able to provide better and more robust services to its customers. However, the costs of purchasing and maintaining backup transceivers and subscriber lines can be quite expensive. Techniques for protecting communication occurring over telecommunication subscriber lines at a reduced cost are generally desirable.

SUMMARY

Embodiments of the present invention generally pertain to systems and methods to backup communication occurring on a plurality of subscriber lines.

A system in accordance with an exemplary embodiment of the present invention comprises a plurality of transceivers and logic. In this regard, a first transceiver is configured to communicate via a first subscriber line with a transceiver located at a remote premises. A second transceiver is configured to communicate via a second subscriber line with a transceiver located at the remote premises, and a third transceiver is configured to communicate via a third subscriber line with a transceiver located at the remote premises. The logic is configured to switch communication from the first transceiver to the third transceiver in response to a detection of a communication problem associated with the first subscriber line. The logic is further configured to switch communication from the second transceiver to the third transceiver in response to a detection of a communication problem associated with the second subscriber line.

A system in accordance with another embodiment of the present invention comprises a plurality of transceivers and logic. In this regard, a first transceiver is configured to communicate via a first subscriber line with a transceiver located at a remote premises. A second transceiver is configured to communicate via a second subscriber line with a transceiver located at the remote premises, and a third transceiver is configured to communicate via a third subscriber line with a transceiver located at the remote premises. The logic is configured to enable the third transceiver to selectively backup both of the first and second transceivers.

A system in accordance with yet another embodiment of the present invention comprises a plurality of transceivers and logic. In this regard, a first transceiver is configured to communicate via a first subscriber line with a transceiver located at a remote premises. A second transceiver is configured to communicate via a second subscriber line with a transceiver located at the remote premises, and a third transceiver is configured to communicate via a third subscriber line with a transceiver located at the remote premises. The logic is configured to split an input data stream into at least a first output data stream and a second output data stream, and the logic is configured to interface the first and second output data streams with the first and second transceivers such that the first and second transceivers respectively transmit the first and second output data streams on the first and second subscriber lines. The logic is further configured to interface one of the output data streams with the third transceiver in response to a communication problem associated with one of the first and second subscriber lines, and the logic is also configured to dynamically select the one output data stream for interfacing with the third transceiver based on which of the first and second subscriber lines is associated with the communication problem.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present invention generally pertains to a system and method to backup communication occurring across communication connections (e.g., twisted pair subscriber lines) extending from a central office to a remote location. In an exemplary embodiment of the present invention, a first subscriber line is used to backup multiple primary subscriber lines that are used to communicate data between a central office and a customer premises. If a significant problem pertaining to communication across any one of the primary subscriber lines arises, then the communication across the problematic subscriber line may be switched to the backup subscriber line. Since the same backup subscriber line may be used to backup a plurality of primary subscriber lines, the total number of overall subscriber lines and subscriber line termination equipment may be reduced thereby helping to reduce the cost associated with implementing and maintaining a protected communication system.

Figure 1:
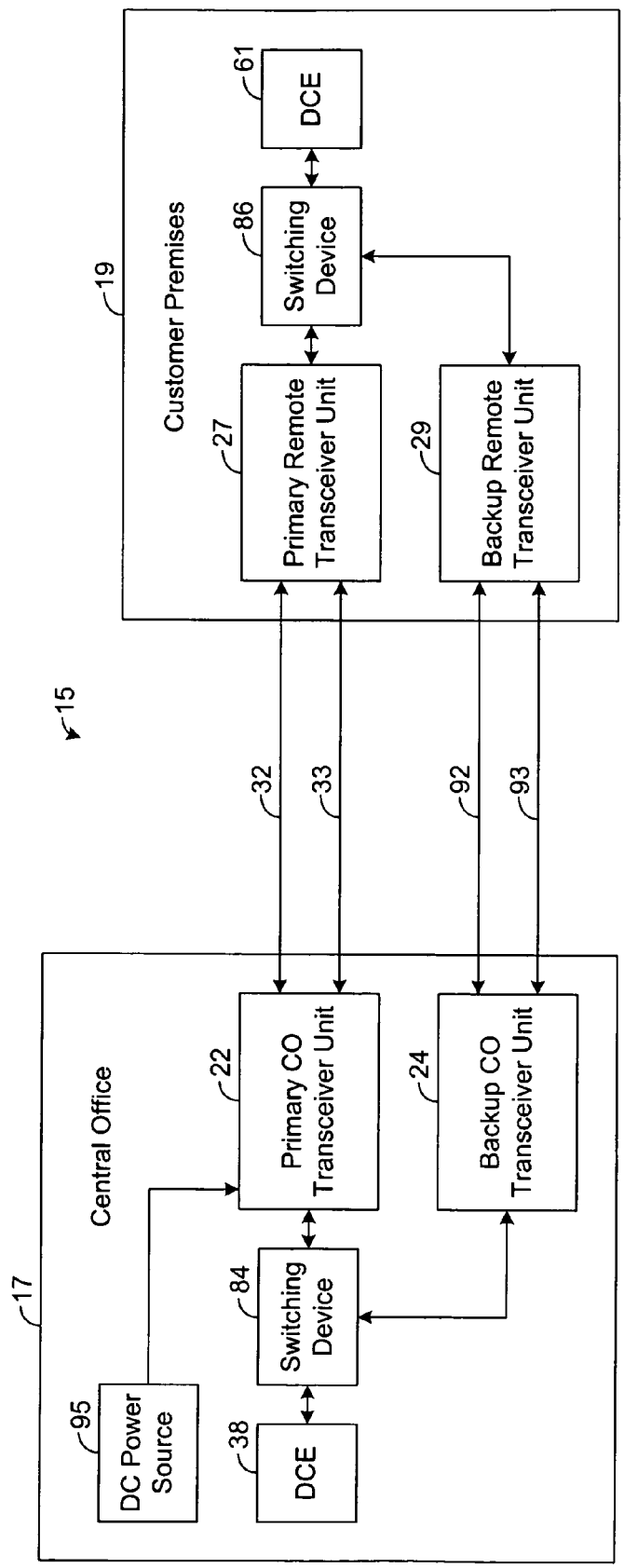
FIG. 1 is a block diagram illustrating a conventional communication system that uses a pair of backup subscriber lines to protect communication occurring over a pair of primary subscriber lines.

FIG. 1 depicts a conventional communication system 15 for communicating between a central office 17 of a communication network, such as the public switched telephone network (PSTN), for example, and a customer premises 19 that is remotely situated from the central office 17. Equipment at the central office 12 and equipment at the customer premises 19 may be configured to communicate data via various known communication protocols. For illustrative purposes, it will be assumed hereafter that such equipment is configured to communicate data according to high-data-rate digital subscriber line 4 (HDSL4) protocol. It is well-known that in such protocol, data is communicated across each subscriber line at 772 kilo-bits per second (Kbrs).

As shown by FIG. 1, the central office 17 comprises a primary central office (CO) transceiver unit 22 and a backup CO transceiver unit 24. In addition, a primary remote transceiver unit 27 and a backup remote transceiver unit 29 reside at the customer premises 19. Via techniques known in the art, the primary CO transceiver unit 22 is configured to communicate with the primary remote transceiver unit 27 over two subscriber lines 32 and 33. Each of the lines 32 and 33 comprises a conductive medium, such as, for example, a twisted pair of copper connections, for communicating data between the transceiver units 22 and 27.

Moreover, data to be communicated from the central office 17 to the customer premises 19 is transmitted, to the primary CO transceiver unit 22, from data communication equipment (DOE) 38 residing at the central office 17. As an example, the DOE 38 may communicate a DS1 data stream, which is known to be a synchronous data stream, to the primary CO transceiver unit 22. Note that the DOE 38 may comprise various known components such as multiplexers, switches, routers, etc. The primary CO transceiver unit 22 divides or splits the data received from the DOE 38 into two data streams. One of these data streams is transmitted over line 32 to the primary remote transceiver unit 27, and the other of these data streams is transmitted over line 33 also to the primary remote transceiver unit 27.

Figure 2:
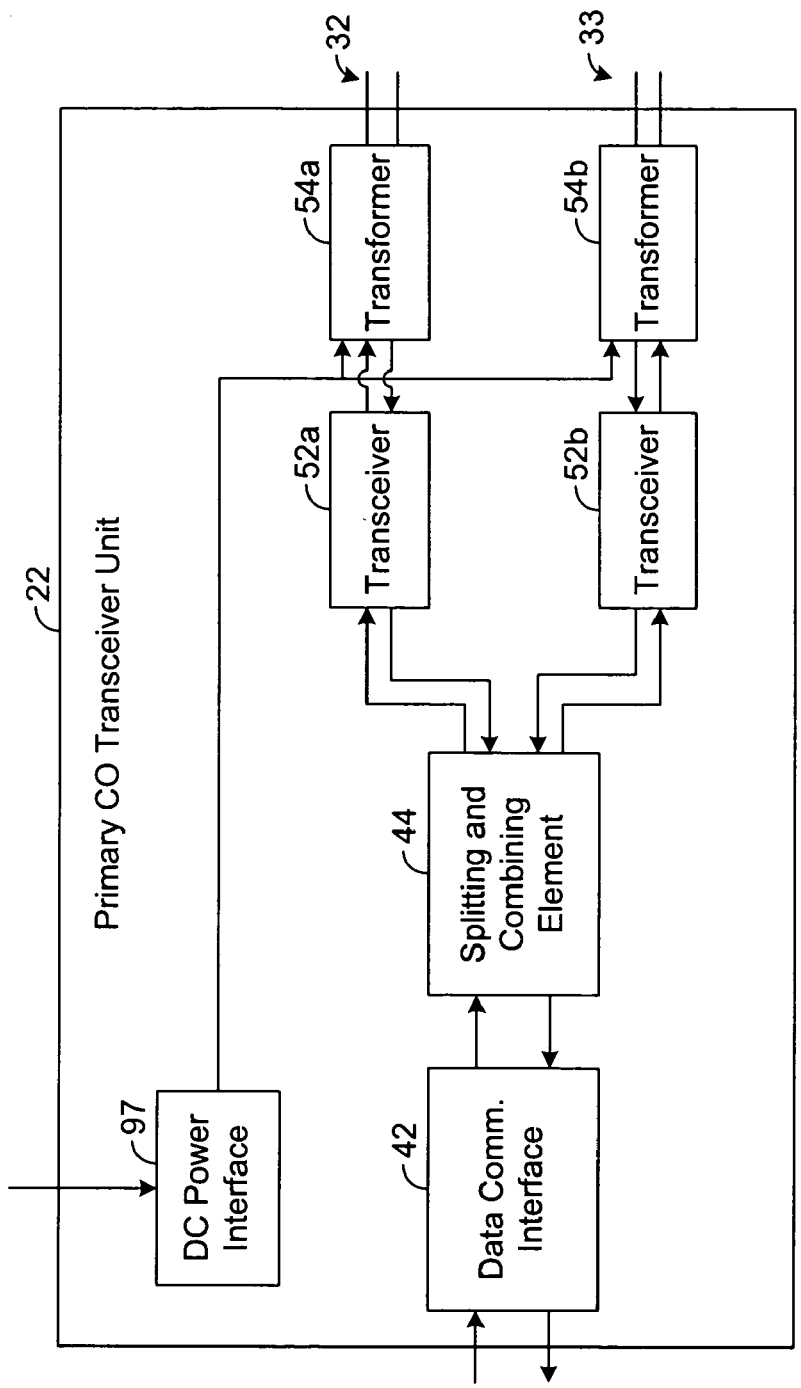
FIG. 2 is a block diagram illustrating a central office (CO) transceiver unit depicted in FIG. 1.

FIG. 2 depicts a more detailed view of the primary CO transceiver unit 22. The transceiver unit 22 of FIG. 2 comprises a data communication interface 42 that communicates with the DCE 38 of FIG. 1. Data received from the DCE 38 is transmitted to a splitting and combining element 44, which splits this data into two data streams. One of the data streams is transmitted to a first primary transceiver 52a that terminates subscriber line 32, and the other of the data streams is transmitted to a second primary transceiver 52b that terminates subscriber line 33. The primary transceiver 52a modulates the data from its received data stream and transmits this data through a transformer 54a and across the subscriber line 32. Furthermore, the primary transceiver 52b similarly modulates the data from its received data stream and transmits this data through a transformer 54b and across subscriber line 33.

Data received by the CO transceiver unit 22 from the subscriber line 32 is received through transformer 54a and demodulated by primary transceiver 52a, and the resulting data is transmitted to the splitting and combining element 44. Further, data received by the CO transceiver unit 22 from the subscriber line 33 is received through transformer 54b and demodulated by primary transceiver 52b, and the resulting data is transmitted to the splitting and combining element 44. The splitting and combining element 44 combines the data streams from the transceivers 52a and 52b into a single data stream and transmits this single data stream to the data communication interface 42, which interfaces such data with the DCE 38 of FIG. 1.

Referring to FIG. 1, data to be communicated from the customer premises 19 to the central office 17 is transmitted, to the primary remote transceiver unit 27, from data communication equipment (DCE) 61 residing at the customer premises 19. Note that the DCE 61 may comprise various known components, such as, for example, a T1 channel service unit (CSU), private branch exchange (PBX), etc. The primary remote transceiver unit 27 then divides or splits the data into two data streams. One of these data streams is transmitted over line 32 to the primary CO transceiver unit 22, and the other of these data streams is transmitted over line 33 to the primary CO transceiver unit 22.

Figure 3:
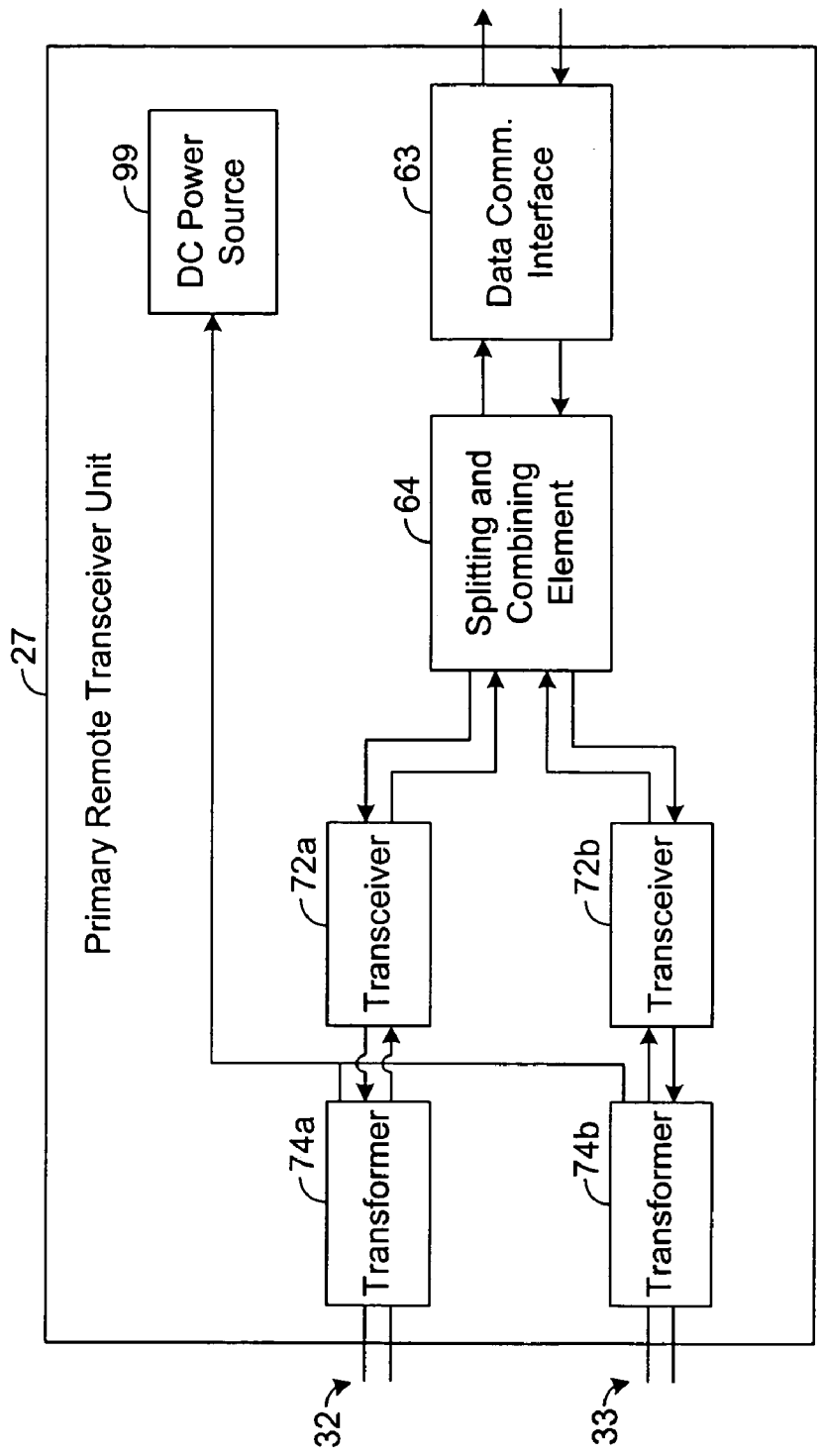
FIG. 3 is a block diagram illustrating a remote transceiver unit depicted in FIG. 1.

FIG. 3 depicts a more detailed view of the primary remote transceiver unit 27. The transceiver unit 27 of FIG. 3 comprises a data communication interface 63 that communicates data with the DCE 61 of FIG. 1. Data received from the DCE 61 is transmitted to a splitting and combining element 64, which splits this data into two data streams. One of the data streams is transmitted to a first primary transceiver 72a that terminates subscriber line 32, and the other of the data streams is transmitted to a second primary transceiver 72b that terminates subscriber line 33. The primary transceiver 72a modulates the data from its received data stream and transmits this data through a transformer 74a and across the subscriber line 32. Furthermore, the primary transceiver 72b similarly modulates the data from its received data stream and transmits this data through a transformer 74b and across subscriber line 33.

Data received by the remote transceiver unit 27 from the subscriber line 32 is received through transformer 74a and demodulated by primary transceiver 72a, and the resulting data is transmitted to the splitting and combining element 64. Further, data received by the remote transceiver unit 27 from the subscriber line 33 is detected by transformer 74b and demodulated by primary transceiver 72b, and the resulting data is transmitted to the splitting and combining element 64. The splitting and combining element 64 combines the data streams from the transceivers 72a and 72b into a single data stream and transmits this single data stream to the data communication interface 63, which interfaces the data from the single data stream with the DCE 61 of FIG. 1.

Typically, the backup transceiver units 24 and 29 of FIG. 1 are utilized when a communication problem between the primary transceiver units 22 and 27 arises. In this regard, logic within the primary CO transceiver unit 22 and/or the primary remote transceiver unit 27 monitors the status of the communication occurring between the two transceiver units 22 and 27. If a problem develops such that communication across at least one of the lines 32 and/or 33 is significantly degraded, then the aforementioned logic may determine to delegate, to the backup transceiver units 24 and 29, the communication of data between the central office 17 and customer premises 19. This decision may be based upon a variety of factors such as, for example, when the signal-to-noise ratio for the communication across at least one of the lines 32 and/or 33 falls below a specified threshold or when the error rate of such communication exceeds a specified threshold.

When the aforementioned logic determines to delegate, to the backup transceiver units 24 and 29, the communication of data between the central office 17 and customer premises 19, the logic notifies switching devices 84 and 86 respectively residing at the central office 17 and the customer premises 19. In response to such notification, the switching devices 84 and 86 respectively switch to the backup transceiver units 24 and 29.

Once the switching devices 84 and 86 switch to the backup transceiver units 24 and 29, data to be communicated between the central office 17 and the customer premises 19 is transmitted and received by the backup transceiver units 24 and 29 in lieu of the primary transceiver units 22 and 27. In this regard, data received from the switching device 84 is divided or split by the backup transceiver unit 24 into two data streams. The backup CO transceiver unit 24 transmits one of these data streams over subscriber line 92 to the backup remote transceiver unit 29, and the backup CO transceiver unit 24 transmits the other of these data streams over subscriber line 93 to the backup remote transceiver unit 29. Note that the components of the backup CO transceiver unit 24 may be configured identical to the components of the primary CO transceiver unit 22 such that, in general, the same communication techniques are employed by the transceiver units 22 and 24 to communicate data.

Further, data received from the switching device 86 is divided or split by the backup remote transceiver unit 29 into two data streams. The backup remote transceiver unit 29 transmits one of these data streams over line 92 to the backup CO transceiver unit 24, and the backup remote transceiver unit 29 transmits the other of these data streams over line 93 to the backup CO transceiver unit 24. Note that the components of the backup remote transceiver unit 29 may be configured identical to the components of the primary remote transceiver unit 27 such that, in general, the same communication techniques are employed by the transceiver units 27 and 29 to communicate data.

Moreover, noting that the backup transceiver units 24 and 29 are used only after the detection of a communication problem between the primary transceiver units 22 and 27, it is likely that the backup transceiver units 24 and 29 are able to communicate better and/or faster than the primary transceiver units 22 and 27 once the switching devices 84 and 86 are switched to the backup transceiver units 24 and 29, as described above. Thus, switching to the backup transceiver units 24 and 29 generally has the effect of improving communication between the central office 17 and the customer premises 19. As a result, installing and utilizing backup transceivers 24 and 29 to backup communication between the central office 17 and the customer premises 19, as described above, may help to improve communication between the central office 17 and the customer premises 19.

However, employing backup transceiver units 24 and 29 to backup primary transceiver units 22 and 27 can be quite costly. First of all, the purchase of additional transceiver units 24 and 29 can be expensive. In addition, the subscriber lines 32, 33, 92, and 93 are typically either purchased or rented, and the additional cost of purchasing or renting additional subscriber lines 92 and 93 to backup communication occurring over primary subscriber lines 32 and 33 also can be expensive. Techniques for reducing the costs associated with attempting to backup communication that occurs over a plurality of subscriber lines are generally desirable.

It should be noted that electrical energy for powering the components of each of the transceiver units 22, 24, 27, and 29 is provided by a direct current (DC) power source 95, which typically resides at the central office 17 as shown by FIG. 1. In this regard, the DC power source 95 is coupled to a DC power interface 97 (FIG. 2), which receives electrical power from the source 95 and distributes the electrical power to the other components of the transceiver unit 22. Further, the DC power interface 97 also provides a portion of the electrical power to primary remote transceiver unit 27 over subscriber lines 32 and 33.

In this regard, DC power interface 97 is coupled to the center taps of the transformers 54a and 54b and creates a voltage difference between the center taps of the transformer 54a and the center taps of the transformer 54b. More specifically, the DC power interface 97 sets the center taps of transformer 54a to a first voltage and sets the center taps of transformer 54b to a substantially different voltage. As a result, the DC voltage of subscriber line 32 is substantially different than the DC voltage of subscriber line 33. Moreover, the remote transceiver unit 27 draws DC power from this voltage difference and utilizes this DC power to power the components of the transceiver unit 27.

In particular, a DC power source 99 (FIG. 3) in the remote transceiver unit 27 is coupled to the center taps of the transformers 74a and 74b and draws DC power from the voltage difference appearing across the center taps of transformer 74a and the center taps of transformer 74b. The DC power source 99 then distributes this power to the other components of the remote transceiver unit 27.

It should be noted that, as described above, the backup CO transceiver unit 24 is typically configured identical to the configuration of the primary CO transceiver unit 22 shown by FIG. 2, and the backup remote transceiver unit 29 is typically configured identical to the configuration of the primary remote transceiver unit 27 shown by FIG. 3. Thus, when a problem occurs between the communication of primary transceiver units 22 and 27, communication according to the same techniques and protocols may be switched to the backup transceiver units 24 and 29 in lieu of the primary transceiver units 22 and 27. When this occurs, the backup CO transceiver unit 24 provides DC power to the backup remote transceiver unit 29 according to the same techniques described above and employed by the primary CO transceiver unit 22 to provide DC power to the primary remote transceiver unit 27.

Figure 4:
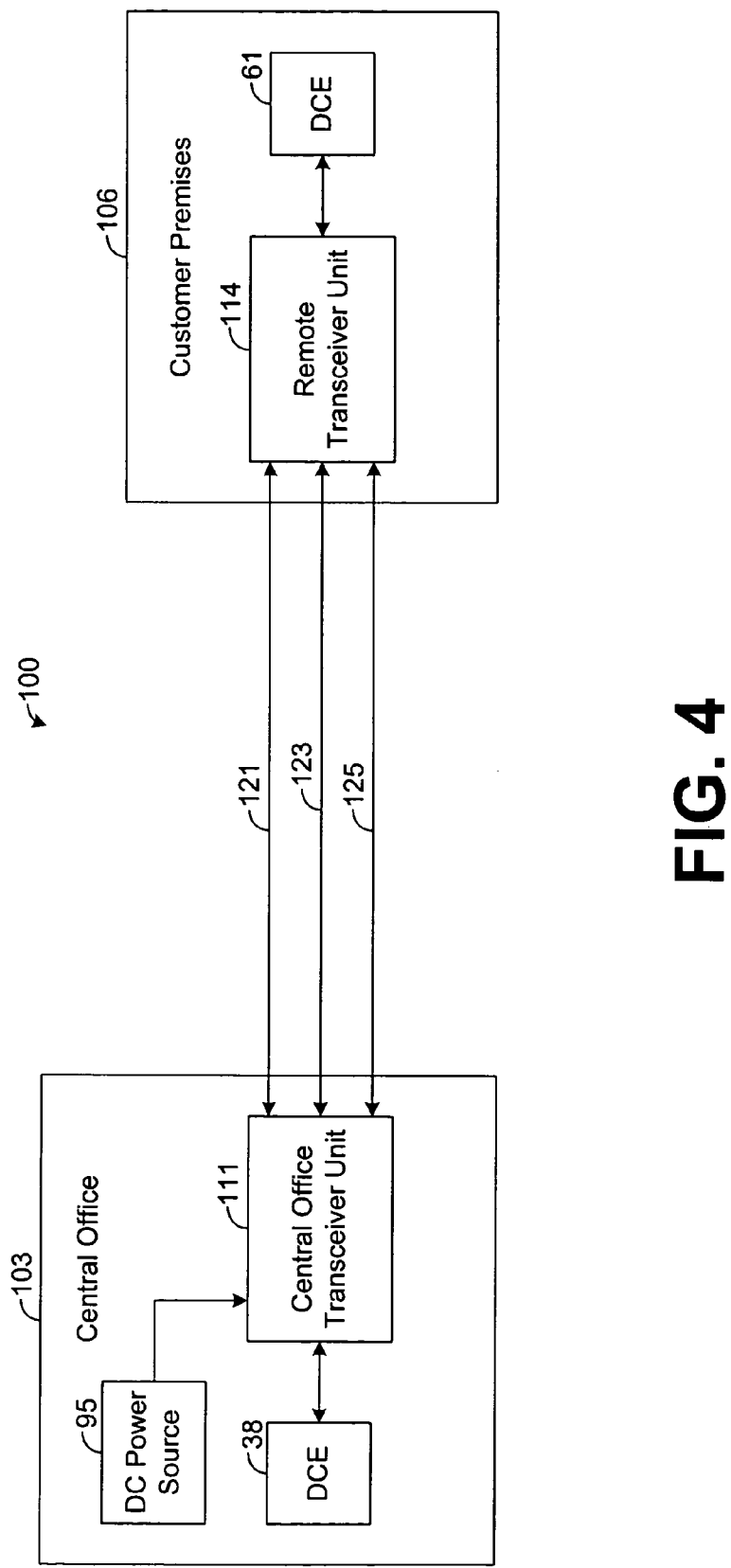
FIG. 4 is a block diagram illustrating a communication system that uses a backup subscriber line to selectively backup communication occurring on a pair of primary subscriber lines in accordance with an exemplary embodiment of the present invention.

FIG. 4 depicts a communication system 100 for communicating between a central office 103 and a remote location, such as a customer premises 106, in accordance with an exemplary embodiment of the present invention. As shown by FIG. 4, the central office 103 comprises a transceiver unit 111 that is configured to communicate with a transceiver unit 114 residing at the customer premises. For illustrative purposes, it will be assumed herein that the transceiver units 111 and 114 are configured to communicate with each other via HDSL4 protocol. However, it should be emphasized that other configurations of the transceiver units 111 and 114 and that other protocols are possible in other embodiments.

In the exemplary embodiment shown by FIG. 4, the transceiver units 111 and 114, except as otherwise described hereafter, are configured to communicate, via HDSL4 standards, across two subscriber lines 121 and 123, which will be referred to hereafter as the "primary subscriber lines." A third subscriber line 125 is preferably utilized to backup either of the primary subscriber lines 121 or 123 in the event that communication across one of these subscriber lines 121 and 123 is significantly degraded. Utilization of this third subscriber line 125, which will be referred to hereafter as "backup subscriber line," will be described in more detail hereinafter.

Figure 5:
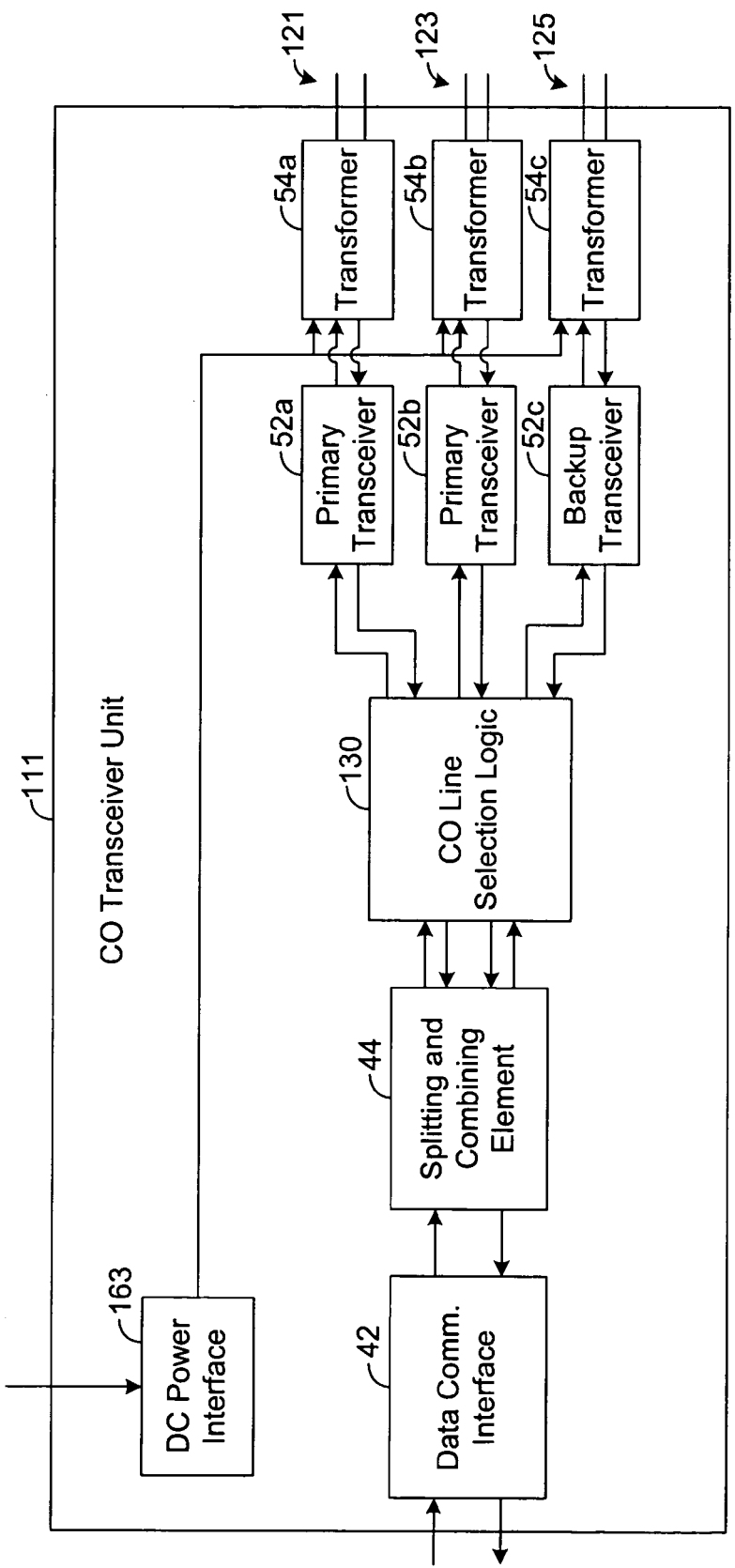
FIG. 5 is a block diagram illustrating an exemplary embodiment of a CO transceiver unit depicted in FIG. 4.

A more detailed view of the CO transceiver unit 111 is depicted by FIG. 5. Similar to the CO transceiver unit 22 depicted by FIG. 2, the CO transceiver unit 111 of FIG. 5 comprises a data communication interface 42, a splitting and combining element 44, transceivers 52a and 52b, and transformers 54a and 54b. Each of the foregoing components may be configured identical to and operate essentially the same as the components of the same reference numerals in FIG. 2. In addition to the aforementioned components, the CO transceiver unit 111 of FIG. 5 also comprises CO line selection logic 130, an additional backup transceiver 52c, and an additional transformer 54c. Note that the backup transceiver 52c may be configured identical to the other transceivers 52a and 52b, and the transformer 54c may be configured identical to the other transformers 54a and 54b. Furthermore, transceivers 52a-52c preferably terminate subscriber lines 121, 123, and 125, respectively.

During operation, the data communication interface 42 receives, from the DCE 38 (FIG. 4), a data stream to be communicated to the customer premises 106. The data communication interface 42 transmits this data stream to the splitting and combining element 44, which splits the data stream into multiple data streams. For HDSL4 communication, the splitting and combining element 44 splits such data into two data streams, which are transmitted to the CO line selection logic 130. The line selection logic 130 is configured to transmit each of the data streams to a different one of the transceivers 52a-52c. In this regard, the line selection logic 130 is initially configured to transmit one of the data streams to primary transceiver 52a and to transmit the other data stream to primary transceiver 52b.

The primary transceiver 52a modulates the data from its received data stream and transmits this data through transformer 54a and across subscriber line 121. Furthermore, the primary transceiver 52b modulates the data from its received data stream and transmits this data through transformer 54b and across subscriber line 123.

Data received by the CO transceiver unit 111 from the subscriber line 121 is received through transformer 54a and demodulated by primary transceiver 52a, and the resulting data is transmitted to the line selection logic 130, which passes such data from the primary transceiver 52a to the splitting and combining element 44. Further, data received by the CO transceiver unit 111 from the subscriber line 123 is received through transformer 54b and demodulated by primary transceiver 52b, and the resulting data is transmitted to the line selection logic 130, which passes such data from the primary transceiver 52b to the splitting and combining element 44. The splitting and combining element 44 combines the data streams from the transceivers 52a and 52b into a single data stream and transmits this single data stream to the data communication interface 42, which interfaces the data from the single data stream with the DCE 38 of FIG. 4.

Data to be communicated from the customer premises 106 to the central office 103 is transmitted from the DCE 61 (FIG. 4) residing at the customer premises 106 to the remote transceiver unit 114. The remote transceiver unit 114 then divides or splits the received data stream into two data streams. Initially, one of these data streams is transmitted over line 121 to the CO transceiver unit 111, and the other of these data streams is transmitted over line 123 to the CO transceiver unit 111.

Figure 6:
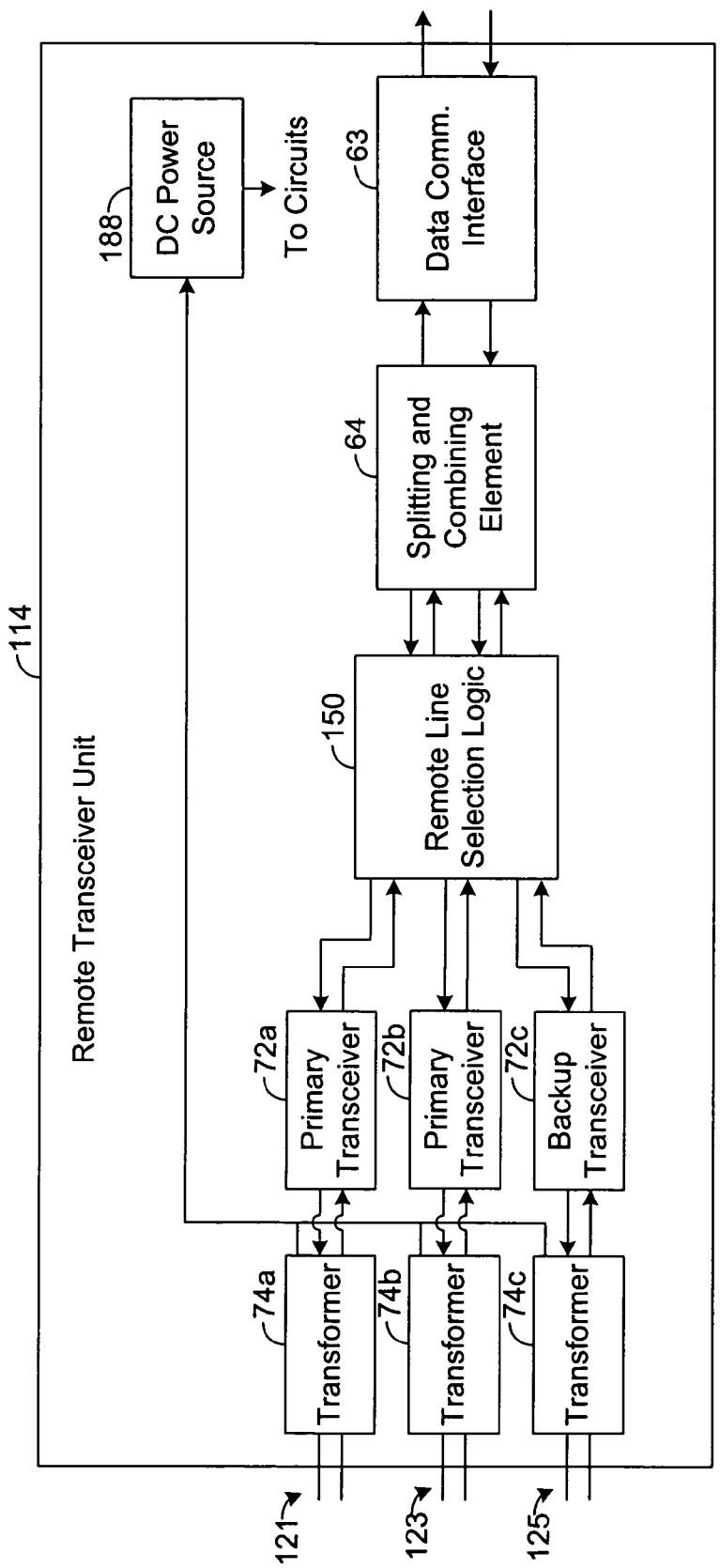
FIG. 6 is a block diagram illustrating an exemplary embodiment of a remote transceiver unit depicted in FIG. 4.

FIG. 6 depicts a more detailed view of the remote transceiver unit 114. Similar to the remote transceiver unit 27 depicted by FIG. 3, the remote transceiver unit 114 of FIG. 6 comprises a data communication interface 63, a splitting and combining element 64, transceivers 72a and 72b, and transformers 74a and 74b. Each of the foregoing components may be configured identical to and operate essentially the same as the components of the same reference numerals in FIG. 3. In addition to the aforementioned components, the remote transceiver unit 114 of FIG. 6 also comprises remote line selection logic 150, an additional backup transceiver 72c, and an additional transformer 74c. Note that the backup transceiver 72c may be configured identical to the other transceivers 72a and 72b, and the transformer 74c may be configured identical to the other transformers 74a and 74b. Furthermore, transceivers 72a-72c preferably terminate subscriber lines 121, 123, and 125, respectively.

During operation, the data communication interface 63 receives, from the DCE 61 (FIG. 4), data to be communicated to the central office 103. The data communication interface 63 transmits this data to the splitting and combining element 64, which splits the data into multiple data streams. For HDSL4 communication, the splitting and combining element 64 splits such data into two data streams, which are transmitted to the remote line selection logic 150. The line selection logic 150 is configured to transmit each of the data streams to a different one of the transceivers 72a-72c. In this regard, the line selection logic 150 is initially configured to transmit one of the data streams to primary transceiver 72a and to transmit the other data stream to primary transceiver 72b.

The primary transceiver 72a modulates the data from its received data stream and transmits this data through transformer 74a and across subscriber line 121. Furthermore, the primary transceiver 72b modulates the data from its received data stream and transmits this data through transformer 74b and across subscriber line 123.

Data received by the remote transceiver unit 114 from the subscriber line 121 is received through transformer 74a and demodulated by primary transceiver 72a, and the resulting data is transmitted to the line selection logic 150, which passes such data from the primary transceiver 72a to the splitting and combining element 64. Further, data received by the remote transceiver unit 114 from the subscriber line 123 is received through transformer 74b and demodulated by primary transceiver 72b, and the resulting data is transmitted to the line selection logic 150, which passes such data from the primary transceiver 72b to the splitting and combining element 64. The splitting and combining element 64 combines the data streams from the transceivers 72a and 72b into a single data stream and transmits this single data stream to the data communication interface 63, which interfaces the data from the single data stream with the DCE 61 of FIG. 4.

As will be described in more detail hereafter, the line selection logic 130 and 150 enable the subscriber line 125 and the transceivers 52c and 72c to be used to backup communication across either of the primary subscriber lines 121 or 123. Note that the line selection logic 130 and 150 can be implemented in software, hardware, or any combination thereof. As an example, some or all of the logic 130 and/or 150 may be implemented in hardware using logic gates and/or other types of hardware devices (e.g., multiplexers, switches, transistors, etc.). Further, at least a portion of the logic 130 and/or 150 may be implemented in software and executed by an instruction execution device, such as a central processing unit (CPU) or a digital signal processor (DSP), for example.

When a portion of the logic 130 and/or 150 is implemented in software, such portion can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with an instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the logic 130 and/or 150 may be magnetically stored and transported on a conventional portable computer diskette.

The CO line selection logic 130 and the remote line selection logic 150 are configured to detect when communication across any one of the primary subscriber lines 121 or 123 has degraded below a threshold level. When this occurs, the line selection logic 130 and 150 are configured to switch communication from the problematic primary subscriber line 121 or 123 to the backup subscriber line 125.

Note that a variety of methodologies may be employed to determine when the communication across one of the primary subscriber lines 121 or 123 has degraded below a threshold level. For example, at least one of the line selection logic 130 and/or 150 may be configured to determine a signal-to-noise ratio for the communication occurring across one of the primary lines 121 or 123 and to determine another signal-to-noise ratio for communication occurring across the other primary line 121 or 123. If either of these signal-to-noise ratios falls below a specified threshold, then the at least one logic 130 and/or 150 may be configured to determine that the communication occurring across the corresponding subscriber line 121 or 123 is to be switched to the backup subscriber line 125.

In another example, at least one of the line selection logic 130 and/or 150 may be configured to determine an error rate for the communication occurring across one of the primary lines 121 or 123 and to determine another error rate for communication occurring across the other primary line 121 or 123. If either of these error rates rises above a specified threshold, then the at least one logic 130 and/or 150 may be configured to determine that the communication occurring across the corresponding subscriber line 121 or 123 is to be switched to the backup subscriber line 125. It should be noted that there are other methodologies for determining when communication across one of the subscriber lines 121 or 123 has become sufficiently degraded such that it is desirable to communicate across the backup subscriber line 125 in lieu of the primary subscriber line 121 or 123 associated with the degraded communication.

It should also be noted that it is not necessary for both of the line selection logic 130 and 150 to monitor the communication occurring across the primary subscriber lines 121 and 123. For example, one of the line selection logic 130 or 150 may monitor such communication and determine when it is desirable to switch communication from one of the primary subscriber lines 121 or 123 to the backup subscriber line 125, according to the techniques described above. When this occurs, the one line selection logic 130 or 150 may be configured to communicate a message to the other line selection logic 130 or 150 instructing the other line selection logic 130 or 150 to switch communication from one of the primary subscriber lines 121 or 123 to the backup subscriber line 125. Such a message may be communicated over one of the primary subscriber lines 121 or 123 via the transceivers terminating the one line 121 or 123 or may be communicated over the backup subscriber line 125.

When the CO line selection logic 130 of FIG. 5 determines that communication across one of the primary lines 121 or 123 is to be switched to the backup subscriber line 125, the logic 130 stops transmitting one of the data streams from the splitting and combining element 44 to the primary transceiver 52a or 52b that is associated with (i.e., communicating over) the one primary line 121 or 123, referred to hereafter as the "degraded line." In lieu of transmitting this data stream to the primary transceiver 52a or 52b associated with the degraded line 121 or 123, the selection logic 130 transmits this data stream to the backup transceiver 52c associated with (i.e., capable of communicating over) the backup subscriber line 125. The backup transceiver 52c modulates the data from this data stream and transmits the modulated data through the transformer 54c and across the backup subscriber line 125. Note that, to conserve power, the line selection logic 130 may be configured to power down the primary transceiver 52a or 52b associated with the degraded line 121 or 123 once communication across the degraded line 121 or 123 is stopped.

Data transmitted across the backup subscriber line 125 from the remote transceiver unit 114 is received through transformer 54c and demodulated by backup transceiver 52c, and the resulting data is transmitted to the line selection logic 130. Once communication across the degraded subscriber line 121 or 123 has been switched to the backup subscriber line 125, the line selection logic 130 is configured to transmit, to the splitting and combining element 44, the data stream received from the backup transceiver 52c and the data stream received from the primary transceiver 52a or 52b still communicating across one of the primary subscriber lines 121 or 123. The splitting and combining element 44 is configured to combine these two data streams into a single data stream and to transmit this single data stream to the data communication interface 42, which interfaces the data from the single data stream with the DCE 38 of FIG. 4. Thus, by implementing the aforementioned techniques, the line selection logic 130 causes the CO transceiver unit 111 to stop communicating across the degraded subscriber line 121 or 123 and to begin communicating across the backup subscriber line 125 instead.

When the remote line selection logic 150 of FIG. 6 determines that communication across the degraded line 121 or 123 is to be switched to the backup subscriber line 125, the logic 150 stops transmitting one of the data streams from the splitting and combining element 64 to the primary transceiver 72a or 72b that is associated with the degraded line 121 or 123. In lieu of transmitting this data stream to the primary transceiver 72a or 72b associated with the degraded line 121 or 123, the selection logic 150 transmits this data stream to the backup transceiver 72c associated with (i.e., capable of communicating over) the backup subscriber line 125. The backup transceiver 72c modulates the data from this data stream and transmits the modulated data through the transformer 74c and across the backup subscriber line 125. Note that, to conserve power, the line selection logic 150 may be configured to power down the primary transceiver 72a or 72b associated with the degraded line 121 or 123 once communication across the degraded line 121 or 123 is stopped.

Data transmitted across the backup subscriber line 125 from the CO transceiver unit 111 is received through transformer 74c and demodulated by backup transceiver 72c, and the resulting data is transmitted to the line selection logic 150. Once communication across the degraded subscriber line 121 or 123 has been switched to the backup subscriber line 125, the line selection logic 150 is configured to transmit, to the splitting and combining element 64, the data stream received from the backup transceiver 72c and the data stream received from the primary transceiver 72a or 72b still communicating across one of the primary active subscriber lines 121 or 123. The splitting and combining element 64 is configured to combine these two data streams into a single data stream and to transmit this single data stream to the data communication interface 63, which interfaces the data from the single data stream with the DCE 61 of FIG. 4.

Thus, by implementing the aforementioned techniques, the line selection logic 150 causes the remote transceiver unit 114 to stop communicating across the degraded subscriber line 121 or 123 and to begin communicating across the backup subscriber line 125 instead. Moreover, once communication across the degraded line 121 or 123 has been switched to the backup subscriber line 125, communication in accordance with the relevant standard (i.e., HDSL4 in the present example) is being achieved via the backup subscriber line 125 and the non-degraded primary subscriber line 121 or 123.

Figure 7:
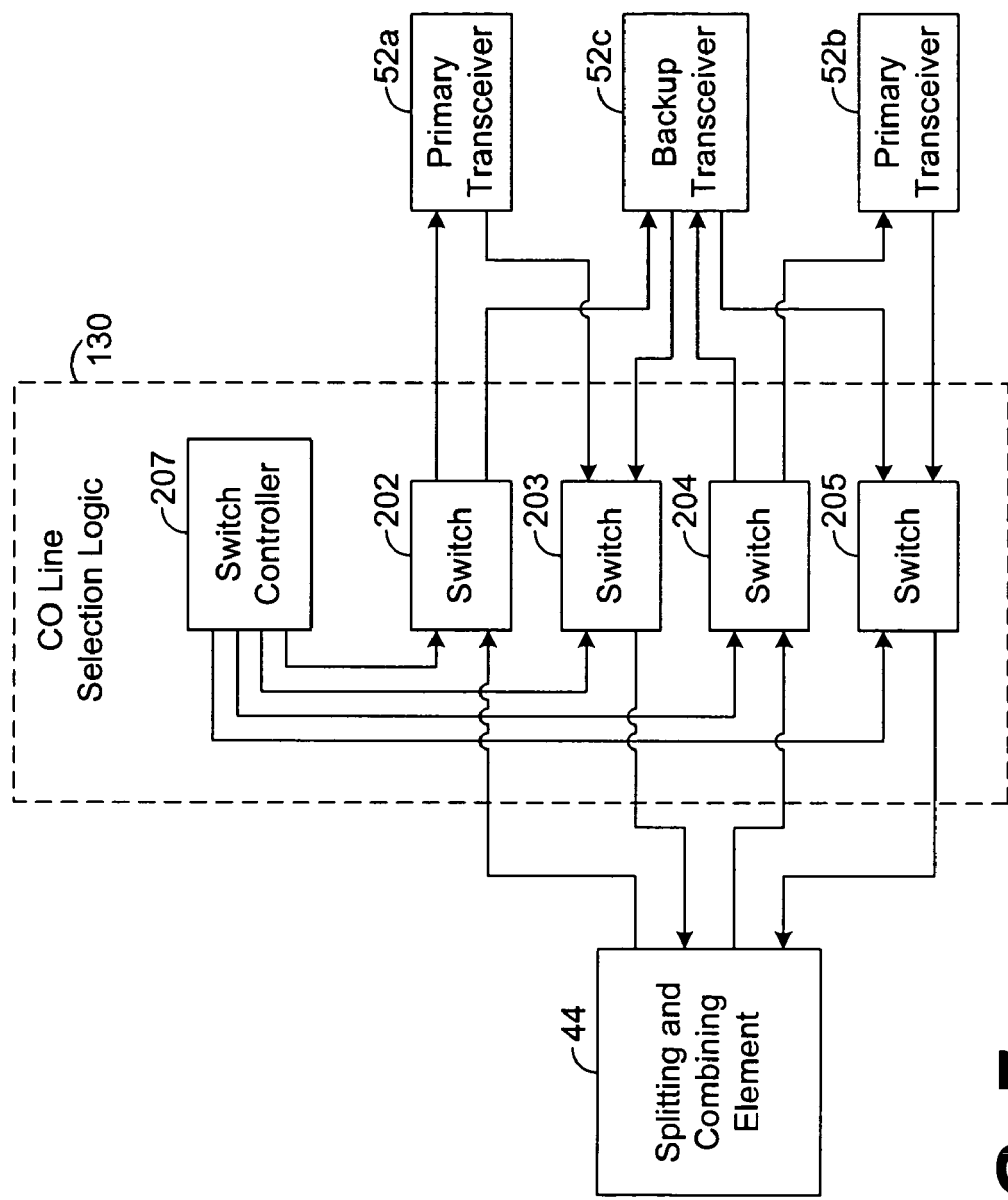
FIG. 7 is a block diagram illustrating an exemplary embodiment of CO line selection logic depicted in FIG. 4.

Note that various configurations of the line selection logic 130 and 150 may be employed to properly switch between the subscriber lines 121, 123, and 125, as described above. FIG. 7 depicts an exemplary embodiment of the CO line selection logic 130. As shown by FIG. 7, the CO line selection logic 130 comprises a plurality of switches 202-205 and a switch controller 207, which may be implemented in hardware, software, or a combination thereof. The switch controller 207 controls the states of the switches 202-205, as well be described in more detail hereafter.

Each of the switches 202 and 203 is coupled to the splitting and combining element 44 and the transceivers 52a and 52c. Initially, each of the switches 202 and 203 is in an open state with respect to backup transceiver 52c and in a closed state with respect to primary transceiver 52a. Thus, initially, the primary transceiver 52a is electrically coupled to the splitting and combining element 44 through switches 202 and 203, and the backup transceiver 52c is electrically isolated from the splitting and combining element 44 by switches 202 and 203. In such an embodiment, a data stream is transmitted from the splitting and combining element 44 to the primary transceiver 52a through switch 202, and a data stream is transmitted from the primary transceiver 52a to the splitting and combining element 44 through switch 203.

Each of the switches 204 and 205 is coupled to the splitting and combining element 44 and the transceivers 52b and 52c. Initially, each of the switches 204 and 205 is in an open state with respect to backup transceiver 52c and in a closed state with respect to primary transceiver 52b. Thus, initially, the primary transceiver 52b is electrically coupled to the splitting and combining element 44 through switches 204 and 205, and the backup transceiver 52c is electrically isolated from the splitting and combining element 44 by switches 204 and 205. In such an embodiment, a data stream is transmitted from the splitting and combining element 44 to the primary transceiver 52b through switch 204, and a data stream is transmitted from the primary transceiver 52b to the splitting and combining element 44 through switch 205.

When the communication occurring across one of the primary subscriber lines 121 or 123 becomes significantly degraded such that a backup switch is to occur, the switch controller 207 changes the states of switches 202-205 coupled to the primary transceiver 52a or 52b of the degraded subscriber line 121 or 123 such that this primary transceiver 52a or 52b is electrically isolated from the splitting and combining element 44 and such that the backup transceiver 52c is electrically coupled to the splitting and combining element 44.

For example, assume that the communication occurring across subscriber line 121 becomes significantly degraded. In such an example, the switch controller 207 changes the states of switches 202 and 203 such that each of these switches 202 and 203 electrically isolates primary transceiver 52a from the splitting and combining element 44 and electrically couples backup transceiver 52c to the splitting and combining element 44. After changing the states of the switches 202 and 203 in this manner, a data stream is transmitted from the splitting and combining element 44 to the backup transceiver 52c through switch 202, and a data stream is transmitted from the backup transceiver 52c to the splitting and combining element 44 through switch 203.

If the backup switch is to switch out primary transceiver 52b instead of primary transceiver 52a (e.g., if the communication occurring across subscriber line 123 instead of line 121 becomes significantly degraded), then the switch controller changes the states of switches 204 and 205 instead of switches 202 and 203. In this regard, the switch controller 207 changes the states of switches 204 and 205 such that each of these switches 204 and 205 electrically isolates primary transceiver 52b from the splitting and combining element 44 and electrically couples backup transceiver 52c to the splitting and combining element 44. After changing the states of the switches 204 and 205 in this manner, a data stream is transmitted from the splitting and combining element 44 to the backup transceiver 52c through switch 204, and a data stream is transmitted from the backup transceiver 52c to the splitting and combining element 44 through switch 205.

Note that the remote line selection logic 150 of FIG. 6 may employ a similar arrangement of switches to control, in a similar manner, which of the transceivers 72a-72c is electrically coupled to and, therefore, communicates with the splitting and combining element 64. Furthermore, the term "switch," in a general sense, may refer to a combination of components (e.g., transistors) for selectively isolating one electrical connection from another. Moreover, is possible for the logic 130 shown by FIG. 7 to be implemented within a single integrated circuit (IC), if desired.

It should be further noted that, similar to the transceiver units of FIG. 1, the transceiver units 111 and 114 of FIG. 4 preferably draw power from a central office power source 95. In this regard, the CO transceiver unit 111 of FIG. 5 preferably comprises a DC power interface 163, which provides power to the components of the transceiver unit 111. Further, the DC power interface 163 is preferably coupled to the transformers 54a-54c so that power from the DC power interface 163 can be provided to the remote transceiver unit 114 via active subscriber lines 121, 123, or 125. However, rather than inducing a voltage difference across multiple active subscriber lines, as described above for conventional DC power interface 97, the DC power interface 163 preferably induces a voltage difference across the center taps of the active transformers 54a-54c, as will be described in more detail below. Note that the terms "active transformer" and "active subscriber line" refer to a transformer and a subscriber line presently being used to communicate data between the central office 103 and the computer premises 106.

Figure 8:
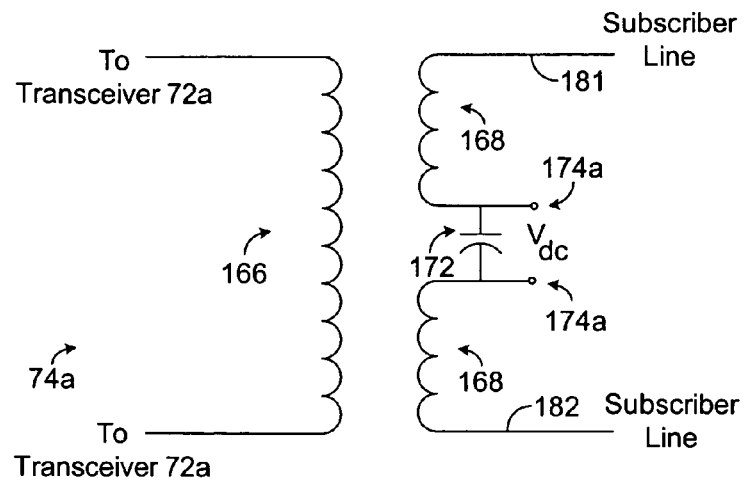
FIG. 8 is a block diagram illustrating an exemplary embodiment of a remote premises transformer depicted in FIG. 6.

FIG. 8 depicts a more detailed view of an exemplary embodiment of one of the transformers 74a within the remote transceiver unit 114 (FIG. 6). As shown by FIG. 8, the transformer 74a preferably comprises a primary winding 166 and two split secondary windings 168 separated by a capacitor 172. The DC power interface 163 preferably applies a substantial DC voltage difference ($V_{dc}$) across the center taps 174a such that a voltage on one conductor 181 of the subscriber line 121 is substantially different than the voltage of the other conductor 182 of the subscriber line 121, assuming that the subscriber line 121 is active. Note that the other transformers 54b and 54c are preferably similarly configured such that a substantial DC voltage difference exists across the two conductors of each active subscriber line 123 and/or 125.

Moreover, power from each of the active subscriber lines 121, 123, or 125 is preferably harnessed and summed at the remote transceiver unit 114, and the summed power is preferably dispersed to the components of the unit 114 via a DC power source 188 (FIG. 6).

Figure 9:
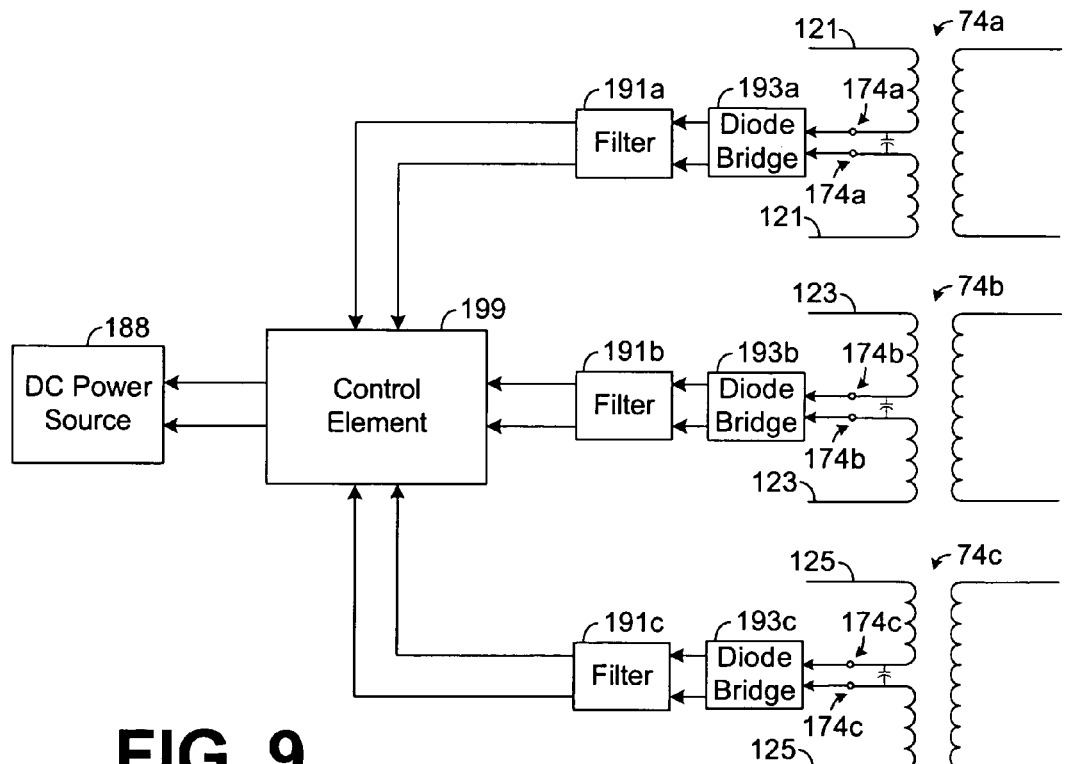
FIG. 9 is a block diagram illustrating an exemplary embodiment of circuitry that may be used to provide power from the transformers of FIG. 6 to a DC power source for powering components of the remote transceiver unit depicted in FIG. 6.

FIG. 9 depicts exemplary circuitry that may be used to provide the DC power source 188 with summed power from the active subscriber lines 121, 123, or 125. As shown by FIG. 9, the center taps 174a-174c of the transformers 74a-74c are preferably interconnected and coupled to the DC power source 188 through filters 191a-191c, diode bridges 193a-193c, and a control element 199, which may be implemented in hardware, software, or any combination thereof. As described above, the DC power source 188 is preferably configured to receive the summed power from the transformers 74a-74c and to distribute this summed power to the components of the remote transceiver unit 114.

Note that the filters 191a-191c help to reduce the effect of an electrical transient on the subscriber line 121, 123, or 125 that is coupled to the respective filter 191a-191c. Further note that the diode bridges 193a-193c enable the voltage difference across the center taps 174a-174c of any of the transformers 74a-74c to be reversed such that it is not necessary to ensure that the voltage differences across the center taps 174a-174c of all of the transformers 74a-74c are aligned for the purposes of summing the power provided to the DC power source 188. However, if it is ensured that the center tap voltage differences are so aligned, then diode bridges 193a-193c are unnecessary and may be removed from the circuitry shown by FIG. 9.

Further, it should be noted that providing power to the remote transceiver unit 114 by inducing a DC voltage difference for each active subscriber line 121, 123, or 125 helps to simplify the circuitry used to implement the transceiver units 111 and 114 and the line selection logic 130 and 150, in particular. In this regard, it is possible to provide power to the remote transceiver unit 114 by inducing a voltage difference between the two active subscriber lines 121, 123, or 125, as is described above for the conventional system 15 depicted by FIG. 1. However, in such an embodiment, once communication is switched from the degraded subscriber line 121 or 123 to the backup subscriber line 125, the voltage to be applied to the transformer 54c and, therefore, to the backup subscriber line 125 is dependent on which of the primary subscriber lines 121 or 123 is being switched out of service or, in other words, is being switched from an active state to an inactive state.

In this regard, assuming that a positive voltage is being applied to the degraded subscriber line 121 or 123 before it is switched out of service, then it is likely that a positive voltage is to be applied to the backup subscriber line 125 when communication is switched from the degraded line 121 or 123 to the backup subscriber line 125. However, if a negative voltage is being applied to the degraded subscriber line 121 or 123 before it is switched out of service, then it is likely that a negative voltage is to be applied to the backup subscriber line 125 when communication is switched from the degraded line 121 or 123 to the backup subscriber line 125.

Such complexity of ensuring that the appropriate voltage is applied to the backup subscriber line 125, depending on which primary subscriber line 121 or 123 is switched out of service, can be obviated by applying a voltage difference across the center taps of each active transformer 54a-54c and 74a-74c, as is described above for the embodiments depicted by FIGS. 8 and 9. Thus, regardless of which primary subscriber line 121 or 123 is switched out, the same voltage difference ($V_{dc}$) may be applied to the center taps of the transformer 54c by the DC power interface 163. Thus, the circuitry used to provide power from the central office 103 to the remote transceiver unit 114 can be simplified.

Note that the control element 199 may be configured to perform a variety of functions. For example, the control element 199 may comprise switches (not shown in FIG. 8) for switching out any of the subscriber lines 121, 123, or 125 not being used to provide power to the remote transceiver unit 114, thereby electrically isolating any such subscriber lines 121, 123, or 125 from the DC power source 188.

As an example, assume that subscriber lines 121 and 123 are initially active and that backup subscriber line 125 is inactive. In such an example, the subscriber lines 121 and 123 and their corresponding transformers 74a and 74b may be electrically coupled to the DC power source 188, which draws power from the voltage differences of these lines 121 and 123. Further, the backup transceiver 72c (FIG. 6) may be powered down, and the control element 199 may, therefore, switch out subscriber line 125 and its corresponding transformer 74c such that these components 125 and 74c are electrically isolated from the DC power source 188.

However, further assume that, at some point, the communication occurring across subscriber line 121 becomes degraded such that the communication is switched to subscriber line 125 instead, according to techniques described herein. More specifically, assume that primary transceiver 72a is powered down and that backup transceiver 72c is powered up and used to communicate with the CO transceiver unit 111 in lieu of transceiver 72a. In such a case, the control element 199 preferably switches out subscriber line 121 and switches in subscriber line 125. In other words, the control element 199 electrically isolates subscriber line 121 and its corresponding transformer 74a from the DC power source 188, and the control element 199 electrically couples subscriber line 125 and its corresponding transformer 74c to the DC power source 188. Thus, the DC power source 188 now draws power from subscriber lines 123 and 125.

Figure 10:
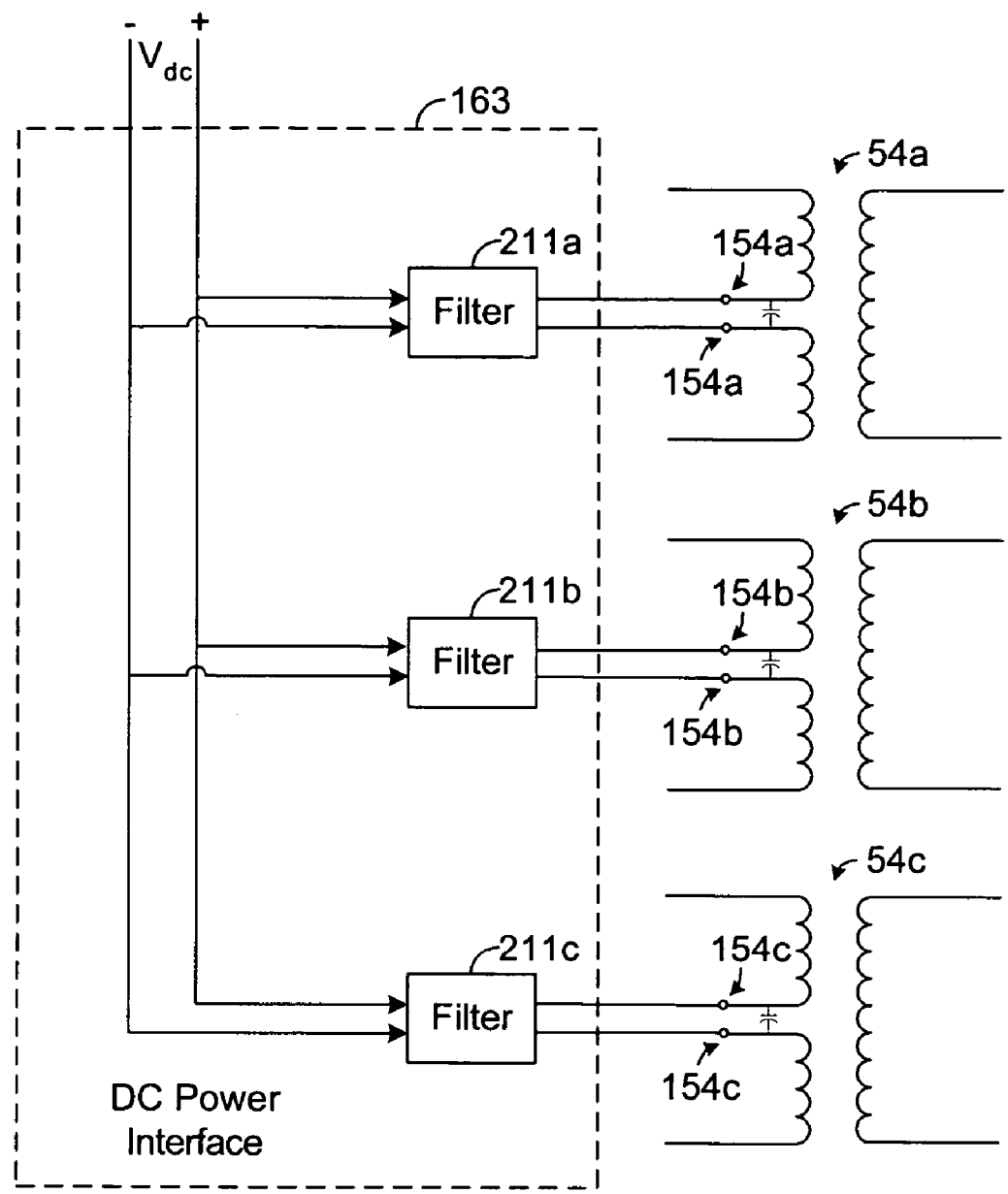
FIG. 10 is a block diagram illustrating an exemplary embodiment of a DC power interface depicted in FIG. 5.
Figure 11:
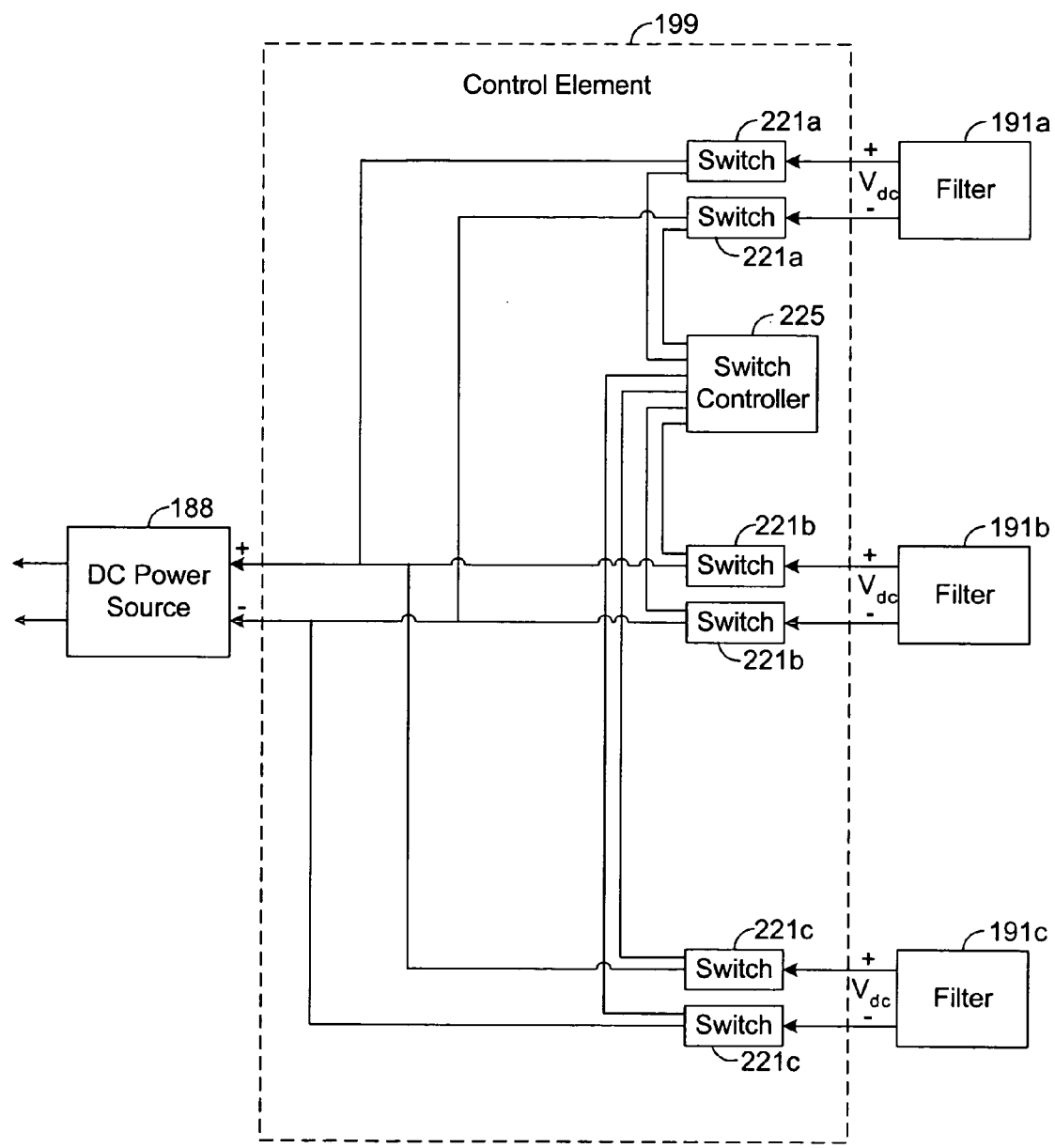
FIG. 11 is a block diagram illustrating an exemplary embodiment of a control element depicted in FIG. 9.

FIGS. 10 and 11 depict exemplary circuitry for the DC power interface 163 (FIG. 5) and the control element 199 (FIG. 9), respectively, in an embodiment that selectively switches out an inactive subscriber line 121, 123, or 125 and applies the same voltage difference ($V_{dc}$) to each of the active subscriber lines 121, 123, or 125, as described above. As shown by FIG. 10, each of the transformers 54a-54c is configured identical to the transformer 74a depicted in FIG. 8 and, therefore, has a pair of center taps 154a-154c, respectively. $V_{dc}$ is applied through filters 211a-211c to center taps 154a-154c, respectively. Thus, each center tap 154a-154c is at a different voltage with respect to the other center tap of the same transformer 154a-154c. Note that filters 211a-211c, similar to the filters 191a-191c of FIG. 9, help to reduce the effects of electrical transients on the subscriber lines 121, 123, and 125.

As shown by FIG. 11, each filter 191a-191c is coupled to the DC power source 188 through a pair of switches 221a-221c, respectively. The operational states of the switches 221a-221c are controlled by switch controller 225, which may be implemented in hardware, software, or a combination thereof. The switch controller 225 controls the states of the switches 221a-221c such that the switches coupled to active subscriber lines 121, 123, and 125 are in a closed state and such that the switches coupled to inactive subscriber lines 121, 123, and 125 are in an open state. When in an closed state, a switch 221a-221c electrically couples the DC power source 188 to the respective filter 191a-191c that is coupled to the switch. When in an open state, a switch 221a-221c electrically isolates the DC power source 188 from the respective filter 191a-191c that is coupled to the switch.

As an example, assume that primary subscriber lines 121 and 123 are active (i.e., being used to communicate data) and that backup subscriber line 125 is inactive. In such an example, the switch controller 225 controls the states of switches 221a-221c such that switches 221a and 221b are in a closed state and switches 221c are in an open state. Thus, filters 191a and 191b are electrically coupled to the DC power source 188, and filter 191c is electrically isolated from the DC power source 188.

However, assume that a communication problem occurs with subscriber line 121 and the communication occurring across this subscriber line 121 is switched to backup subscriber line 125. In such an example, the switch controller 225 changes the states of switches 221a and 221c such that switches 221a are in an open state and switches 221c are in a closed state. Thus, filters 191b and 191c are now electrically coupled to the DC power source 188, and filter 191a is now electrically isolated from the DC power source 188.

Although the exemplary embodiments described above are in accordance with HDSL4 protocol, it should be noted that the present invention is not so limited. In this regard, it is possible for other protocols and other numbers of subscriber lines to be employed to communicate between the central office 103 and the customer premises 106. In this regard, it is possible for a backup subscriber line to be employed to backup any number of a plurality of other subscriber lines without departing from the principles of the present invention.

In addition, it should also be noted that it is desirable for the CO transceiver unit 111 to be an integrated unitary structure for easy installation of the CO transceiver unit 111 at the central office 103. Thus, it may be desirable for each of the transceiver unit components shown by FIG. 5 to be housed within and/or by a housing unit (not shown). Note that various designs and configurations of such a housing unit are possible.

Further, it is also desirable for the remote transceiver unit 114 to be an integrated unitary structure for easy installation of the remote transceiver unit 114 at the customer premises 106. Thus, it may be desirable for each of the transceiver unit components shown by FIG. 6 to be housed within and/or by a housing unit (not shown). Note that various designs and configurations of such a housing unit are possible.

However, it should be specifically mentioned that it is possible for the transceiver unit components depicted by FIG. 5 to reside within separate non-integrated devices, if desired. It is also possible for the transceiver unit components depicted by FIG. 6 to reside within separate non-integrated devices, if desired.

Figure 12:
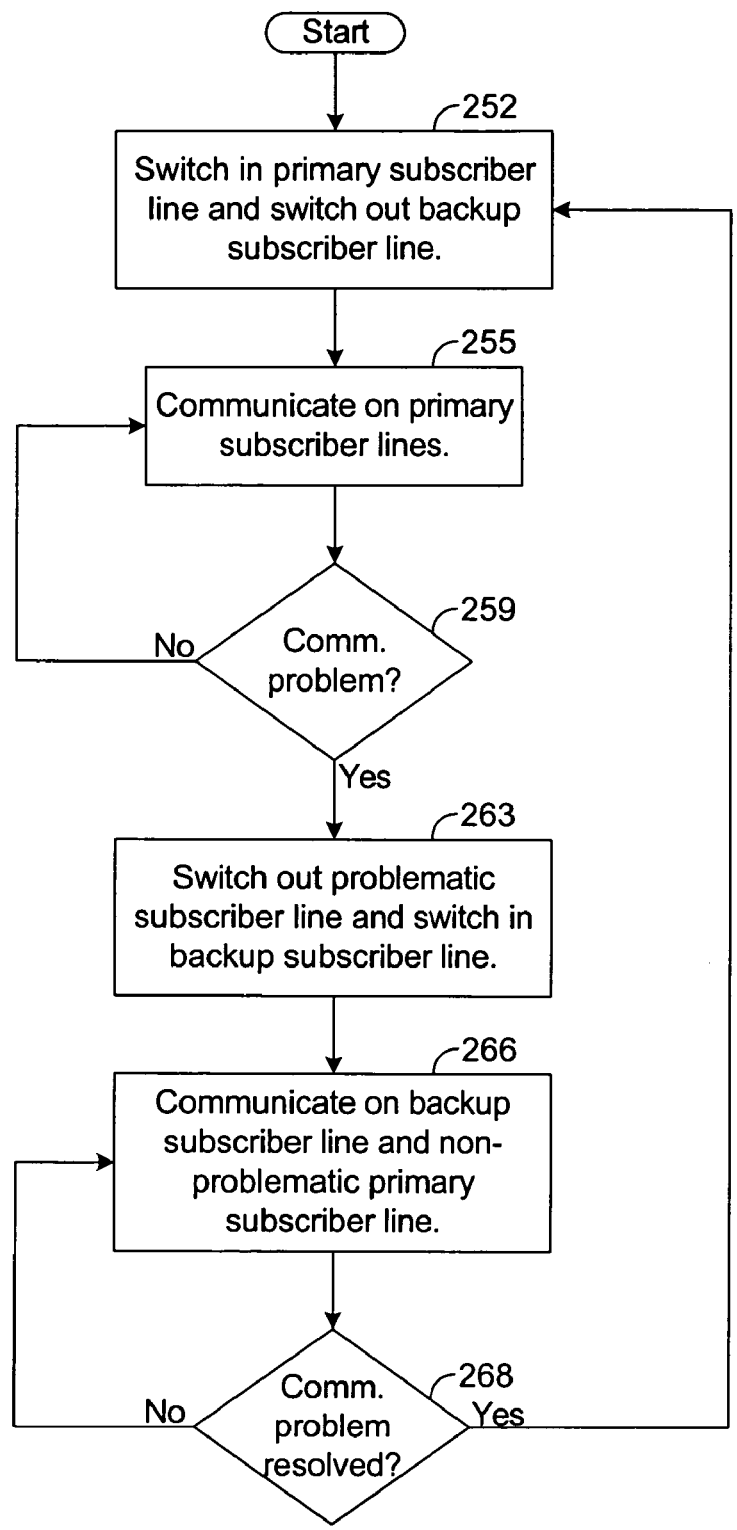
FIG. 12 is a flow chart illustrating an exemplary process for communicating on the subscriber lines depicted in FIG. 4.

FIG. 12 depicts a process for communicating on the subscriber lines 121, 123, and 125 in accordance with one exemplary embodiment of the present invention. In this regard, the primary subscriber lines 121 and 123 are initially switched in, and the backup subscriber line 125 is initially switch out, as shown by block 252 of FIG. 12. In particular, the switch controller 225 (FIG. 11) controls the switches 221a-221c such that switches 221a and 221b are in closed states and switches 221c are in open states. Further, the switch controller 207 of FIG. 7 controls the switches 202-204 such that the primary transceivers 52a and 52b are electrically coupled to the splitting and combining element 44 and backup transceiver 52c is electrically isolated from the splitting and combining element 44. Similarly, switches (not shown) in the remote line selection logic 150 are controlled such that the primary transceivers 72a and 72b are electrically coupled to the splitting and combining element 64 and backup transceiver 72c is electrically isolated from the splitting and combining element 64.

In block 255, communication occurs on primary subscriber lines 121 and 123. In this regard, the splitting and combining element 44 of FIG. 5 splits a data stream from data communication interface 42 into two data streams, which are respectively communicated by primary transceivers 52a and 52b to remote premises transceivers 72a and 72b (FIG. 6) across the primary subscriber lines 121 and 123. Further, the splitting and combining element 64 of FIG. 6 splits a data stream from data communication interface 63 into two data streams, which are respectively communicated by primary transceivers 72a and 72b to central office transceivers 52a and 52b (FIG. 5) across the primary subscriber lines 121 and 123.

At some point, the line selection logic 130 (FIG. 5) and 150 (FIG. 6) detect a communication problem associated with one of the primary subscriber lines 121 or 123, as shown by block 259 of FIG. 12. As an example, assume hereafter that line selection logic 130 and 150 detect a communication problem associated with primary subscriber line 121 (e.g., the data rate of subscriber line 121 falls below a specified threshold). In such an example, the problematic subscriber line 121 is switched out, and the backup subscriber line 125 is switched in, as shown by block 263 of FIG. 12.

In this regard, based on a determination that a communication problem exists for subscriber line 121, the CO line selection logic 130 dynamically selects, for transmission to the backup transceiver 54c, the data stream being provided to the primary transceiver 54a. In particular, the switch controller 207 of FIG. 7 controls the switches 202-204 such that the primary transceiver 52b and backup transceiver 52c are electrically coupled to the splitting and combining element 44 and transceiver 52a is electrically isolated from the splitting and combining element 44. Thus, the data stream being communicated on subscriber line 121 is instead communicated on subscriber line 125.

Similarly, switches (not shown) in the remote line selection logic 150 are controlled such that the primary transceiver 72b and backup transceiver 72c are electrically coupled to the splitting and combining element 64 and transceiver 72a is electrically isolated from the splitting and combining element 64. Further, the remote line selection logic 150 preferably informs the control element 199 of the backup switch. In response, the switch controller 225 of FIG. 11 controls the switches 221a and 221c such that switches 221a are now in an open state and switches 221c are now in a closed state.

In block 266, communication occurs on primary subscriber line 123 and backup subscriber line 125. In this regard, the splitting and combining element 44 of FIG. 5 splits the data stream from data communication interface 42 into two data streams, which are respectively communicated by primary transceiver 52b and backup transceiver 52c to remote premises transceivers 72b and 72c (FIG. 6) across the subscriber lines 123 and 125. Further, the splitting and combining element 64 of FIG. 6 splits the data stream from data communication interface 63 into two data streams, which are respectively communicated by transceivers 72b and backup transceiver 72c to central office transceivers 52b and 52c (FIG. 5) across the subscriber lines 123 and 125. Thus, communication is switched from the primary subscriber line 121 to the backup subscriber line 125. If desired, communication may be switched back to the problematic primary subscriber line 121 if the communication problem associated with this subscriber line 121 is resolved, as shown by blocks 268 and 252.

It should be emphasized that the above-described embodiments of the present invention are possible examples of implementations, merely set forth for a clear understanding of the principles of the invention. Many variations and modifications may be made to the above-described embodiments of the invention without departing substantially from the spirit and principles of the invention.

The invention claimed is:

1. A communication system, comprising:
a first transceiver coupled to a first subscriber line the first transceiver configured to communicate via the first subscriber line with a remote transceiver that is located at a remote premises and coupled to the first subscriber line, the first subscriber line comprising a first plurality of conductive connections extending from the first transceiver to the remote transceiver coupled to the first subscriber line:
a second transceiver coupled to a second subscriber line, the second transceiver configured to communicate via the second subscriber line with a remote transceiver that is located at the remote premises and coupled to the second subscriber line, the second subscriber line comprising a second plurality of conductive connections extending from the second transceiver to the remote transceiver coupled to the second subscriber line;
a third transceiver coupled to a third subscriber line, the third transceiver configured to communicate via the third subscriber line with a remote transceiver that is located at the remote premises and coupled to the third subscriber line, the third subscriber line comprising a third plurality of conductive connections extending from the third transceiver to the remote transceiver coupled to the third subscriber line;
logic configured to receive a data stream comprising data to be received by data communication equipment at the remote premises, the logic configured to split the data stream such that a portion of the data is modulated and transmitted by the first transceiver across the first plurality of conductive connections to the remote transceiver coupled to the first subscriber line while a portion of the data stream is modulated and transmitted by the second transceiver across the second plurality of conductive connections to the remote transceiver coupled to the second subscriber line, the logic configured to switch communication from the first transceiver to the third transceiver in response to a detection of a communication problem associated with the first subscriber line such that a portion of the data is modulated and transmitted by the third transceiver across the third plurality of conductive connections to the remote transceiver coupled to the third subscriber line while a portion of the data stream is modulated and transmitted by the second transceiver across the second plurality of conductive connections to the remote transceiver coupled to the second subscriber line, the logic further configured to switch communication from the second transceiver to the third transceiver in response to a detection of a communication problem associated with the second subscriber line such that a portion of the data is modulated and transmitted by the third transceiver across the third plurality of conductive connections to the remote transceiver coupled to the third subscriber line while a portion of the data stream is modulated and transmitted by the first transceiver across the first plurality of conductive connections to the remote transceiver coupled to the first subscriber line; and
a control element configured to sum power from at least two of the subscriber lines.

2. The system of claim 1, wherein the first, second, and third transceivers are located at a central office of a telecommunication network.

3. The system of claim 1, wherein the first, second, and third transceivers are located at a customer premises.

4. The system of claim 1, further comprising:
a transformer coupled to the third transceiver, the transformer having a pair of taps coupled to the third subscriber line; and
a direct current (DC) power interface configured to apply a DC voltage difference across the taps.

5. The system of claim 1, further comprising:
a direct current (DC) power source; and
a control element configured to electrically isolate the first subscriber line from the DC power source when the third transceiver is being used to backup the first transceiver, the control element further configured to electrically couple the first subscriber line to the DC power source when the first transceiver is communicating on the first subscriber line such that electrical power is provided from the first subscriber line to the DC power source.

6. The system of claim 1, wherein each of the transceivers is configured to transmit data at a rate of 772 kilo-bits per second.

7. A communication system, comprising:
a first transceiver coupled to a first subscriber line, the first transceiver configured to communicate via the first subscriber line with a remote transceiver that is located at a remote premises and coupled to the first subscriber line, the first subscriber line comprising a first plurality of conductive connections extending from the first transceiver to the remote transceiver coupled to the first subscriber line;
a second transceiver coupled to a second subscriber line, the second transceiver configured to communicate via the second subscriber line with a remote transceiver that is located at the remote premises and coupled to the second subscriber line, the second subscriber line comprising a second plurality of conductive connections extending from the second transceiver to the remote transceiver coupled to the second subscriber line;

a third transceiver coupled to a third subscriber line, the third transceiver configured to communicate via the third subscriber line with a remote transceiver that is located at the remote remises and coupled to the third subscriber line the third subscriber line comprising a third plurality of conductive connections extending from the third transceiver to the remote transceiver coupled to the third subscriber line;

logic configured to receive an input data stream comprising data to be received by data communication equipment at the remote premises, the logic configured to split the data stream into at least a first output data stream and a second output data stream, wherein the first transceiver is configured to transmit at least a portion of the first output data stream across the first subscriber line while the second transceiver is transmitting at least a portion of the second output data stream across the second subscriber line, the logic further configured to enable the third transceiver to selectively backup both of the first and second transceivers such that the third transceiver communicates a portion of either the first or second output data stream in response to a detection of a communication problem while one of the first and second transceivers is communicating a portion of the other output data stream; and a control element configured to sum power from at least two of the subscriber lines.

8. The system of claim 7, wherein the logic is configured to switch communication from the first transceiver to the third transceiver such that the third transceiver communicates a portion of the first output data stream in response to the detection if the communication problem is associated with the first subscriber line, and wherein the logic is further configured to switch communication from the second transceiver to the third transceiver such that the third transceiver communicates a portion of the second output data stream in response to the detection if the communication problem is associated with the second subscriber line.

9. The system of claim 7, further comprising:
a transformer coupled to the third transceiver, said transformer having a pair of taps coupled to the third subscriber line; and
a direct current (DC) power interface configured to apply a DC voltage difference across the taps.

10. The system of claim 7, further comprising a direct current (DC) power source, wherein the control element is configured to electrically isolate the first subscriber line from the DC power source when the third transceiver is being used to backup the first transceiver, the control element further configured to electrically couple the first subscriber line to the DC power source when the first transceiver is communicating on the first subscriber line.

11. The system of claim 7, wherein the first plurality of conductive connections comprises a first twisted pair, wherein the second plurality of conductive connections comprises a second twisted pair, and wherein the third plurality of conductive connections comprises a third twisted pair.

12. The system of claim 7, wherein the first transceiver is configured to modulate data via a modulation scheme, wherein the second transceiver is configured to modulate data via the modulation scheme, and wherein the third transceiver is configured to modulate data via the modulation scheme.

13. The system of claim 7 further comprising logic configured to receive the first and second output data streams from the remote transceivers and to combine the first and second output data streams thereby recovering the input data stream.

14. The system of claim 13, wherein the input data stream is a synchronous data stream.

15. The system of claim 7 wherein each of the transceivers is configured to transmit data at a rate of 772 kilo-bits per second.

16. A communication system, comprising:
a first transceiver coupled to a first subscriber line, the first transceiver configured to communicate via the first subscriber line with a remote transceiver that is located at a remote premises and coupled to the first subscriber line, the first subscriber line comprising a first plurality of conductive connections extending from the first transceiver to the remote transceiver coupled to the first subscriber line;

a first transformer coupled to the first transceiver, the first transformer having a first pair of taps coupled to the first subscriber line;

a second transceiver coupled to a second subscriber line, the second transceiver configured to communicate via the second subscriber line with a remote transceiver that is located at the remote premises and coupled to the second subscriber line, the second subscriber line comprising a second plurality of conductive connections extending from the second transceiver to the remote transceiver coupled to the second subscriber line;

a second transformer coupled to the second transceiver, the second transformer having a second air of taps coupled to the second subscriber line;

a third transceiver coupled to a third subscriber line, the third transceiver configured to communicate via the third subscriber line with a remote transceiver that is located at the remote premises and coupled to the third subscriber line, the third subscriber line comprising a third plurality of conductive connections extending from the third transceiver to the remote transceiver coupled to the third subscriber line;

a third transformer coupled to the third transceiver, the third transformer having a third pair of taps coupled to the third subscriber line;

logic configured to split an input data stream into at least a first output data stream and a second output data stream, the logic configured to interface the first and second output data streams with the first and second transceivers such that the first and second transceivers respectively transmit the first and second output data streams on the first and second subscriber lines, the logic further configured to interface one of the output data streams with the third transceiver in response to a communication problem associated with one of the first and second subscriber lines, the logic further configured to dynamically select the one output data stream for interfacing with the third transceiver based on which of the first and second subscriber lines is associated with the communication problem; and a direct current (DC) power interface configured to apply a DC voltage difference across the first pair of taps and to apply a DC voltage difference across the second pair of taps, the DC power interface further configured to apply a DC voltage difference across the third pair of taps.

17. The system of claim 16, further comprising:
a direct current (DC) power source; and
a control element configured to electrically isolate the first subscriber line from the DC power source when the third transceiver is being used to backup the first transceiver, the control element further configured to electrically couple the first subscriber line to the DC power source when the first transceiver is communicating on the first subscriber line.

18. The system of claim 16, wherein each of the first output data stream and the second output data stream has a data rate of 772 kilo-bits per second.

19. A communication system, comprising:
a first transceiver coupled to a first subscriber line the first transceiver configured to communicate via the first subscriber line with a remote transceiver that is located at a remote premises and coupled to the first subscriber line, the first subscriber line comprising a first plurality of conductive connections extending from the first transceiver to the remote transceiver coupled to the first subscriber line;
a second transceiver coupled to a second subscriber line, the second transceiver configured to communicate via the second subscriber line with a remote transceiver that is located at the remote premises and coupled to the second subscriber line, the second subscriber line comprising a second plurality of conductive connections extending from the second transceiver to the remote transceiver coupled to the second subscriber line;
a third transceiver coupled to a third subscriber line the third transceiver configured to communicate via the third subscriber line with a remote transceiver that is located at the remote premises and coupled to the third subscriber line, the third subscriber line comprising a third plurality of conductive connections extending from the third transceiver to the remote transceiver coupled to the third subscriber line;
logic configured to split an input data stream into at least a first output data stream and a second output data stream, the logic configured to interface the first and second output data streams with the first and second transceivers such that the first and second transceivers respectively transmit the first and second output data streams on the first and second subscriber lines, the logic further configured to interface one of the output data streams with the third transceiver in response to a communication problem associated with one of the first and second subscriber lines, the logic further configured to dynamically select the one output data stream for interfacing with the third transceiver based on which of the first and second subscriber lines is associated with the communication problem; and
a control element configured to sum power from at least two of the subscriber lines.

20. A communication method, comprising the steps of:
receiving a data stream;
splitting the data stream into at least a first data stream and a second data stream;
communicating at least a portion of the first data stream between a first pair of transceivers on a first subscriber line, the first subscriber line extending from one of the first pair of transceivers to the other of the first pair of transceivers and comprising a first twisted pair coupled to a first pair of taps of a first transformer;
communicating, during the communicating at least the portion of the first data stream step, at least a portion of the second data stream between a second pair of transceivers on a second subscriber line, the second subscriber line extending from one of the second pair of transceivers to the other of the second pair of transceivers and comprising a second twisted pair coupled to a second pair of taps of a second transformer;
enabling a third pair of transceivers coupled to a third subscriber line to selectively backup both of the first and second pair of transceivers such that the third pair of transceivers communicates a portion of either the first or second data stream in response to a detection of a communication problem during one of the communicating steps, the third subscriber line extending from one of the third pair of transceivers to the other of the third pair of transceivers and comprising a third twisted pair coupled to a third pair of taps of a third transformer; and
applying a direct current (DC) voltage difference across the first pair of taps;
applying a DC voltage difference across the second pair of taps; and
applying a DC voltage difference across the third pair of taps.

21. The method of claim 20, further comprising the steps of:
switching communication from the first pair of transceivers to the third pair of transceivers in response to a detection of a communication problem associated with the communicating at least the portion of the first output data stream step; and
switching communication from the second pair of transceivers to the third pair of transceivers in response to a detection of a communication problem associated with the communicating at least the portion of the second output data stream step.

22. The method of claim 20, further comprising the steps of:
receiving the first and second data streams from the subscriber lines; and
combining the received first and second data streams.

23. The method of claim 22, wherein the received data stream is a synchronous data stream.

24. The method of claim 20, wherein each of the first data stream and the second data stream has a data rate of 772 kilo-bits per second.

25. A communication method, comprising the steps of:
receiving a data stream;
splitting the data stream into at least a first data stream and a second data stream;
communicating at least a portion of the first data stream between a first pair of transceivers on a first subscriber line, the first subscriber line extending from one of the first pair of transceivers to the other of the first air of transceivers and comprising a first twisted pair;
communicating, during the communicating at least the portion of the first data stream step, at least a portion of the second data stream between a second air of transceivers on a second subscriber line, the second subscriber line extending from one of the second pair of transceivers to the other of the second pair of transceivers and comprising a second twisted pair;
enabling a third pair of transceivers coupled to a third subscriber line to selectively backup both of the first and second pair of transceivers such that the third pair of transceivers communicates a portion of either the first or second data stream in response to a detection of a communication problem during one of the communicating steps, the third subscriber line extending from one of the third air of transceivers to the other of the third air of transceivers and comprising a third twisted pair; and
summing power from at least two of the subscriber lines.

26. A communication method, comprising the steps of:
splitting a data stream into a first data stream and a second data stream;

interfacing the first data stream with a first transceiver such that the first data stream is communicated by the first transceiver on a first subscriber line to a remote transceiver that is located at a remote premises and coupled to the first subscriber line, the first subscriber line comprising a first plurality of conductive connections extending from the first transceiver to the remote transceiver coupled to the first subscriber line;

interfacing, during the interfacing the first data stream step, the second data stream with a second transceiver such that the second data stream is communicated by the second transceiver on a second subscriber line to a remote transceiver that is located at the remote premises and coupled to the second subscriber line, the second subscriber line comprising a first plurality of conductive connections extending from the second transceiver to the remote transceiver coupled to the second subscriber line;

detecting a communication problem associated with one of the first and second subscriber lines;

interfacing, in response to the detecting step and during one of the interfacing steps, one of the first and second data streams with a third transceiver such that the one data stream is communicated by the third transceiver on a third subscriber line to a remote transceiver that is located at the remote remises and coupled to the third subscriber line, the third subscriber line comprising a third plurality of conductive connections extending from the third transceiver to the remote transceiver coupled to the third subscriber line;

dynamically selecting the one data stream to be interfaced with the third transceiver in response to the detecting step based on which of the first and second subscriber lines is associated with the communication problem; and summing power from at least two of the subscriber lines.

27. The method of claim 26, further comprising the step of applying a direct current (DC) voltage difference to a pair of transformer taps coupled to the third subscriber line.

28. The method of claim 26, wherein each of the first data stream and the second data stream has a data rate of 772 kilo-bits per second.

29. A communication system, comprising:
a first transceiver coupled to a first subscriber line the first transceiver configured to communicate via the first subscriber line with a remote transceiver that is located at a remote premises and coupled to the first subscriber line the first subscriber line comprising a first plurality of conductive connections extending from the first transceiver to the remote transceiver coupled to the first subscriber line;

a second transceiver coupled to a second subscriber line, the second transceiver configured to communicate via the second subscriber line with a remote transceiver that is located at the remote premises and coupled to the second subscriber line, the second subscriber line comprising a second plurality of conductive connections extending from the second transceiver to the remote transceiver coupled to the second subscriber line;

a third transceiver coupled to a third subscriber line the third transceiver configured to communicate via the third subscriber line with a remote transceiver that is located at the remote premises and coupled to the third subscriber line, the third subscriber line comprising a third plurality of conductive connections extending from the third transceiver to the remote transceiver coupled to the third subscriber line;

logic configured to receive a data stream comprising data to be received by data communication equipment at the remote premises, the logic configured to split the data stream such that a portion of the data is modulated and transmitted by the first transceiver across the first plurality of conductive connections to the remote transceiver coupled to the first subscriber line while a portion of the data stream is modulated and transmitted by the second transceiver across the second plurality of conductive connections to the remote transceiver coupled to the second subscriber line, the logic configured to switch communication from the first transceiver to the third transceiver in response to a detection of a communication problem associated with the first subscriber line such that a portion of the data is modulated and transmitted by the third transceiver across the third plurality of conductive connections to the remote transceiver coupled to the third subscriber line while a portion of the data stream is modulated and transmitted by the second transceiver across the second plurality of conductive connections to the remote transceiver coupled to the second subscriber line, the logic further configured to switch communication from the second transceiver to the third transceiver in response to a detection of a communication problem associated with the second subscriber line such that a portion of the data is modulated and transmitted by the third transceiver across the third plurality of conductive connections to the remote transceiver coupled to the third subscriber line while a portion of the data stream is modulated and transmitted by the first transceiver across the first plurality of conductive connections to the remote transceiver coupled to the first subscriber line;

a first transformer coupled to the first transceiver, the first transformer having a first pair of taps coupled to the first subscriber line;

a second transformer coupled to the second transceiver, the second transformer having a second pair of taps coupled to the second subscriber line;

a third transformer coupled to the third transceiver, the third transformer having a third pair of taps coupled to the third subscriber line; and a direct current (DC) power interface configured to apply a DC voltage difference across the first pair of taps and to apply a DC voltage difference across the second pair of taps, the DC power interface further configured to apply a DC voltage difference across the third pair of taps.

30. The system of claim 29, further comprising a control element at the remote premises, the control element configured to sum power from at least one of the subscriber lines with power from another of the subscriber lines thereby providing a summed power for use at the remote premises.

31. The system of claim 29, further comprising:
a direct current (DC) power source at the remote premises; and
a control element configured to electrically isolate the third subscriber line from the DC power source while the first and second output data streams are being communicated across the first and second subscriber lines, the control element further configured to electrically couple the third subscriber line to the DC power source in response to the detection of the communication problem such that electrical power is provided from the third subscriber line to the DC power source, wherein the control element is configured to sum power from at least one of the subscriber lines with power from another of the subscriber lines.

* * * * *